US010812822B2

(12) United States Patent
Rapaka et al.

(10) Patent No.: US 10,812,822 B2
(45) Date of Patent: Oct. 20, 2020

(54) INTRA BLOCK COPY MERGE MODE AND PADDING OF UNAVAILABLE IBC REFERENCE REGION

(71) Applicant: QUALCOMM Incorporated, San Diego, CA (US)

(72) Inventors: Krishnakanth Rapaka, San Diego, CA (US); Vadim Seregin, San Diego, CA (US); Rajan Laxman Joshi, San Diego, CA (US); Marta Karczewicz, San Diego, CA (US); Cheng-Teh Hsieh, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 100 days.

(21) Appl. No.: 15/271,922

(22) Filed: Sep. 21, 2016

(65) Prior Publication Data

US 2017/0099495 A1 Apr. 6, 2017

Related U.S. Application Data

(60) Provisional application No. 62/236,763, filed on Oct. 2, 2015.

(51) Int. Cl.
*H04N 19/513* (2014.01)
*H04N 19/523* (2014.01)
(Continued)

(52) U.S. Cl.
CPC ......... *H04N 19/513* (2014.11); *H04N 19/105* (2014.11); *H04N 19/46* (2014.11);
(Continued)

(58) Field of Classification Search
CPC .. H04N 19/513; H04N 19/523; H04N 19/105; H04N 19/64; H04N 19/176;
(Continued)

(56) References Cited

U.S. PATENT DOCUMENTS 9,877,043 B2 * 1/2018 He ................... H04N 19/521
2013/0114722 A1 5/2013 Koyama et al.
(Continued)

OTHER PUBLICATIONS

Response to Written Opinion dated Dec. 12, 2016 from International Application No. PCT/US2016/053112, filed on Jul. 25, 2017, 3 pp.
(Continued)

*Primary Examiner* — Tung T Vo
(74) *Attorney, Agent, or Firm* — Campbell C. Chiang; Shumaker & Sieffert P.A.

(57) ABSTRACT

A device for decoding video data adds motion information of a neighboring block of a current block to a merge candidate list, wherein the motion information comprises a motion vector of the neighboring block, and wherein the motion vector refers to the current picture; receives an index indicating a merge candidate from the merge candidate list; and in response to the index indicating the merge candidate corresponding to the motion information of the neighboring block, predicts the current block using a lower precision motion vector that represents a rounded version of the motion vector of the neighboring block.

32 Claims, 10 Drawing Sheets

(51) Int. Cl.
*H04N 19/105* (2014.01)
*H04N 19/46* (2014.01)
*H04N 19/172* (2014.01)
*H04N 19/176* (2014.01)
*H04N 19/182* (2014.01)
*H04W 88/02* (2009.01)

(52) U.S. Cl.
CPC ......... *H04N 19/523* (2014.11); *H04N 19/172* (2014.11); *H04N 19/176* (2014.11); *H04N 19/182* (2014.11); *H04W 88/02* (2013.01)

(58) Field of Classification Search
CPC .... H04N 19/46; H04N 19/172; H04N 19/182; H04W 88/02
USPC ..................................................... 375/240.16
See application file for complete search history.

(56) References Cited

U.S. PATENT DOCUMENTS

| | | | |
|---|---|---|---|
| 2013/0208799 A1 | 8/2013 | Srinivasamurthy et al. | |
| 2014/0044180 A1* | 2/2014 | Chen ...................... | H04N 19/52 375/240.16 |
| 2014/0146892 A1 | 5/2014 | Sugio et al. | |
| 2014/0254687 A1* | 9/2014 | Kondo ................. | H04N 19/523 375/240.16 |
| 2014/0286427 A1* | 9/2014 | Fukushima .......... | H04N 19/105 375/240.16 |
| 2014/0294085 A1* | 10/2014 | Layachi ............... | H04N 19/105 375/240.16 |
| 2015/0208086 A1 | 7/2015 | Chen et al. | |
| 2015/0296222 A1* | 10/2015 | Llin ...................... | H04N 19/597 375/240.16 |
| 2015/0326866 A1* | 11/2015 | Ikai ........................ | H04N 19/70 375/240.25 |
| 2015/0326881 A1* | 11/2015 | Ikai ...................... | H04N 19/117 375/240.12 |
| 2015/0373366 A1* | 12/2015 | He ........................ | H04N 19/521 375/240.16 |
| 2016/0100189 A1* | 4/2016 | Pang .................... | H04N 19/593 375/240.13 |
| 2016/0255359 A1* | 9/2016 | Yu ........................ | H04N 19/105 375/240.15 |
| 2016/0316221 A1* | 10/2016 | Ikai ...................... | H04N 19/597 |
| 2016/0323573 A1* | 11/2016 | Ikai ...................... | H04N 19/597 |
| 2016/0337649 A1* | 11/2016 | Chuang ................ | H04N 19/159 |
| 2017/0099495 A1* | 4/2017 | Rapaka ................ | H04N 19/513 |
| 2017/0289566 A1* | 10/2017 | He ....................... | H04N 19/52 |
| 2017/0295370 A1* | 10/2017 | Xu ....................... | H04N 19/117 |
| 2017/0310961 A1* | 10/2017 | Liu ...................... | H04N 19/107 |
| 2017/0332099 A1* | 11/2017 | Lee ...................... | H04N 19/56 |

OTHER PUBLICATIONS

Chen J., et al., "Further Improvements to HMKTA-1.1," 52. VCEG Meeting, Jun. 19 through 26, 2015, WARSAW,PL; (Video Coding Experts Group of ITU-T SG.16), No. VCEG-AZ07_V2, Jun. 25, 2015 , XP030003886, 8 pp.
Chuang T-D., et al., "Non-RCE1: Simplification of RCE1 Test2," 17. JCT-VC Meeting; Mar. 27 through Apr. 4, 2014; Valencia, ES; (Joint Collaborative Team on Video Coding of ISO/IEC JTC1/5C29/WG11 and ITU-T SG.16); URL: http://wftp3.itu.int/av-arch/jctvc-site/, No. JCTVC-Q0092-v3, Mar. 26, 2014, XP030116002, 5 pp.
International Search Report and Written Opinion from International Application No. PCT/US2016/053112, dated Dec. 12, 2016, 15 pp.
Li B., et al., "Adaptive Motion Vector Resolution for Screen Content," 19. JCT-VC Meeting; Oct. 17 through 24, 2014; Strasbourg, FR; (Joint Collaborative Team on Video Coding of ISO/IEC JTC1/SC29/WG11 and ITU-T SG.16); URL: http://wftp3.itu.int/av-arch/jctvc-site/, No. JCTVC-S0085-r1, Oct. 23, 2014, XP030116828, 14 pp.

Lin J.L., et al., "Motion Vector Coding Techniques for HEVC," IEEE 13th International Workshop on Multimedia Signal Processing (MMSP), Oct. 17 through 19, 2011, XP032027557, published on IEEE Xplore on Dec. 1, 2011, 6 pp.
Li X., et al., "RCE1.2: Adaptive MV Precision," 17. JCT-VC Meeting; Mar. 27 through Apr. 4, 2014; Valencia, ES; (Joint Collaborative Team on Video Coding of ISO/IEC JTC1/SC29/WG11 and ITU-T SG.16); URL: http://wftp3.itu.int/av-arch/jctvc-site/, No. JCTVC-Q0049, Mar. 17, 2014 , XP030115940, 4 pp.
Rapaka K., et al., "On Intra Block Copy Merge Vector Handling," 22. JCT-VC Meeting; Oct. 15 through 21, 2015; Geneva, CH; (Joint Collaborative Team on Video Coding of ISO/IEC JTC1/SC29/WG11 and ITU-T SG.16); URL: http://wftp3.itu.int/AV-ARCH/JCTVC-SITE/, No. JCTVC-V0049, Oct. 6, 2015 XP030117698, 2 pp.
Rapaka K., et al., "On Unification of Adapative Motion Vector Resolution," 21. JCT-VC Meeting, Jun. 19 through 26, 2015, Warsaw,PL; (Joint Collaborative Team on Video Coding of ISO/IEC JTC1/SC29/WG11 and ITU-T SG.16), URL: http://wftp3.itu.int/av-arch/jctvc-site/, No. JCTVC-U0081, Jun. 10, 2015, XP030117506, 4 pp.
Sullivan G., et al., "Meeting Report of the 21st Meeting of the Joint Collaborative Team on Video Coding (JCT-VC)," Warsaw, PL, Jun. 19 through 26, 2015, JCTVC_U_Notes_dB, Jul. 3, 2015 (Jul. 3, 2015), XP55319747, Nov. 15, 2016, 84 pp.
Sullivan G., et al., "Meeting Report of the 22nd meeting of the Joint Collaborative Team on Video Coding (JCT-VC), Geneva, CH, Oct. 15-21, 2015," JCTVC-V_Notes_d7, Oct. 24, 2015 , XP55319738, 77 pp.
ITU-T H.265, Series H: Audiovisual and Multimedia Systems, Infrastructure of audiovisual services—Coding of moving video, Advanced video coding for generic audiovisual services, the International Telecommunication Union. Apr. 2015, 634 pp.
Joshi et al., "High Efficiency Video Coding (HEVC) Screen Content Coding: Draft 4," 21st Meeting, Jun. 19 through 26, 2015, Warsaw, PL (Joint Collaborative Team on Video Coding (JCT-VC) of ITU-T SG 16 WP 3 and ISO/IEC JTC 1/SC 29/WG 11), JCTVC-U1005_v1, Sep. 5, 2015, 675 pp.
Wang et al., "High Efficiency Video Coding (HEVC) efect Report 2," 15th Meeting, Oct. 23 through Nov. 1, 2013, Geneva, CH; (Joint Collaborative Team on Video Coding (JCT-VC) of ITU-T SG 16 WP 3 and ISO/IEC JTC 1/SC 29/WG 11), JCTVC-O1003_v2, Nov. 24, 2013, 311 pp.
Flynn et al., "High Efficiency Video Coding (HEVC) Range Extensions text specification: Draft 7," 17th Meeting, Mar. 27 through Apr. 4, 2014, Valencia, ES; (Joint Collaborative Team on Video Coding (JCT-VC) of ITU-T SG 16 WP 3 and ISO/IEC JTC 1/SC 29/WG 11); JCTVC-Q1005_v4, Apr. 10, 2014, 379 pp.
Bross et al., "High efficiency video coding (HEVC) text specification draft 10 (for FDIS & Last Call)," 12th Meeting: Geneva, CH, Jan. 14-23, 2013, (Joint Collaborative Team on Video Coding of ISO/IEC JTC1/SC29/WG11 and ITU-T SG.16); JCTVC-L1003_v34, Mar. 19, 2013, 310 pp.
Rapaka et al., "On intra block copy merge vector handling," 22nd Meeting, Oct. 15 through 21, 2015, Geneva, CH; (Joint Collaborative Team on Video Coding (JCT-VC)of ITU-T SG 16 WP 3 and ISO/IEC JTC 1/SC 29/WG 11), JCTVC-V0049_R1, Oct. 14, 2015, 2 pp.
Second Written Opinion from corresponding PCT Application Serial No. PCT/US2016/053112 dated Sep. 25, 2017 (4 pages).
International Preliminary Report on Patentability—PCT/US2016/053112—ISA/EPO—dated Jan. 26, 2018 10 pages.
Joshi, et al., "High Efficiency Video Coding (HEVC) Screen Content Coding: Draft 3," JCT-VC Meeting; Feb. 10-17, 2015; (Joint Collaborative Team on Video Coding of ISO/IEC JTC1/SC29/WG11 and ITU-T SG.16 ); No. JCTVC-T1005_v2, Apr. 5, 2015, 567 pp.
Joshi R., et al., "HEVC Screen Content Coding Draft Text 4", 21. JCT-VC Meeting; Jun. 19, 2015-Jun. 26, 2015; Warsaw; (Joint Collaborative Team on Video Coding of ISO/IEC JTC1/SC29/

(56) References Cited

OTHER PUBLICATIONS

WG11 and ITU-T SG.16 ); URL: http://wftp3.itu.int/av-arch/jctvc-site/,No. JCTVC-U1005-v2, Sep. 5, 2015 (Sep. 5, 2015), XP030117647, pp. 1-636.

* cited by examiner

ILLUSTRATION OF INTRA BC

INTRA BLOCK COPY MERGE MODE AND PADDING OF UNAVAILABLE IBC REFERENCE REGION

This Application claims the benefit of U.S. Provisional Patent Application 62/236,763 filed 2 Oct. 2015, the entire content of which is hereby incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra picture) prediction and/or temporal (inter picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra coded (I) slice of a picture are encoded using spatial prediction with respect to reference samples in neighboring blocks in the same picture. Video blocks in an inter coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter coded block is encoded according to a motion vector that points to a block of reference samples forming the predictive block, and the residual data indicating the difference between the coded block and the predictive block. An intra coded block is encoded according to an intra coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for including an intra block copy candidate in a merge candidate list for a block of video data coded in a merge mode.

In one example, a method of decoding video data includes, for a current block of a current picture, adding motion information of a neighboring block of the current block to a merge candidate list, wherein the motion information comprises a motion vector of the neighboring block, and wherein the motion vector refers to the current picture; receiving an index indicating a merge candidate from the merge candidate list; and in response to the index indicating the merge candidate corresponding to the motion information of the neighboring block, predicting the current block using a lower precision motion vector that represents a rounded version of the motion vector of the neighboring block.

In another example, a method of encoding video data includes, for a current block of a current picture, adding motion information of a neighboring block of the current block to a merge candidate list, wherein the motion information comprises a motion vector of the neighboring block, and wherein the motion vector refers to the current picture; selecting a merge candidate from the merge candidate list; in response to the selected merge candidate corresponding to the motion information of the neighboring block, locating a predictive block for the current block using a lower precision motion vector that represents a rounded version of the motion vector of the neighboring block; and encoding the current block using the predictive block.

In another example, a device for decoding video data includes a memory configured to store the video data and one or more processors configured to: for a current block of a current picture, add motion information of a neighboring block of the current block to a merge candidate list, wherein the motion information comprises a motion vector of the neighboring block, and wherein the motion vector refers to the current picture; receive an index indicating a merge candidate from the merge candidate list; and in response to the index indicating the merge candidate corresponding to the motion information of the neighboring block, predict the current block using a lower precision motion vector that represents a rounded version of the motion vector of the neighboring block.

In another example, a device for encoding video data includes a memory configured to store the video data and one or more processors configured to: for a current block of a current picture, add motion information of a neighboring block of the current block to a merge candidate list, wherein the motion information comprises a motion vector of the neighboring block, and wherein the motion vector refers to the current picture; select a merge candidate from the merge candidate list; in response to the selected merge candidate corresponding to the motion information of the neighboring block, locate a predictive block for the current block using a lower precision motion vector that represents a rounded version of the motion vector of the neighboring block; and encode the current block using the predictive block.

In another example, a device for decoding video data includes means for adding motion information of a neighboring block of a current block to a merge candidate list, wherein the motion information comprises a motion vector of the neighboring block, and wherein the motion vector refers to the current picture; means for receiving an index indicating a merge candidate from the merge candidate list; and means for predicting the current block using a lower precision motion vector that represents a rounded version of the motion vector of the neighboring block in response to the index indicating the merge candidate corresponding to the motion information of the neighboring block.

In another example, a computer readable storage medium storing instructions that when executed by one or more processors cause the one or more processors to: for a current block of a current picture, add motion information of a neighboring block of the current block to a merge candidate list, wherein the motion information comprises a motion vector of the neighboring block, and wherein the motion vector refers to the current picture; receive an index indicating a merge candidate from the merge candidate list; and in response to the index indicating the merge candidate corresponding to the motion information of the neighboring block, predict the current block using a lower precision motion vector that represents a rounded version of the motion vector of the neighboring block.

The details of one or more examples of the disclosure are set forth in the accompanying drawings and the description below. Other features, objects, and advantages will be apparent from the description, drawings, and claims.

DETAILED DESCRIPTION

Figure 1:
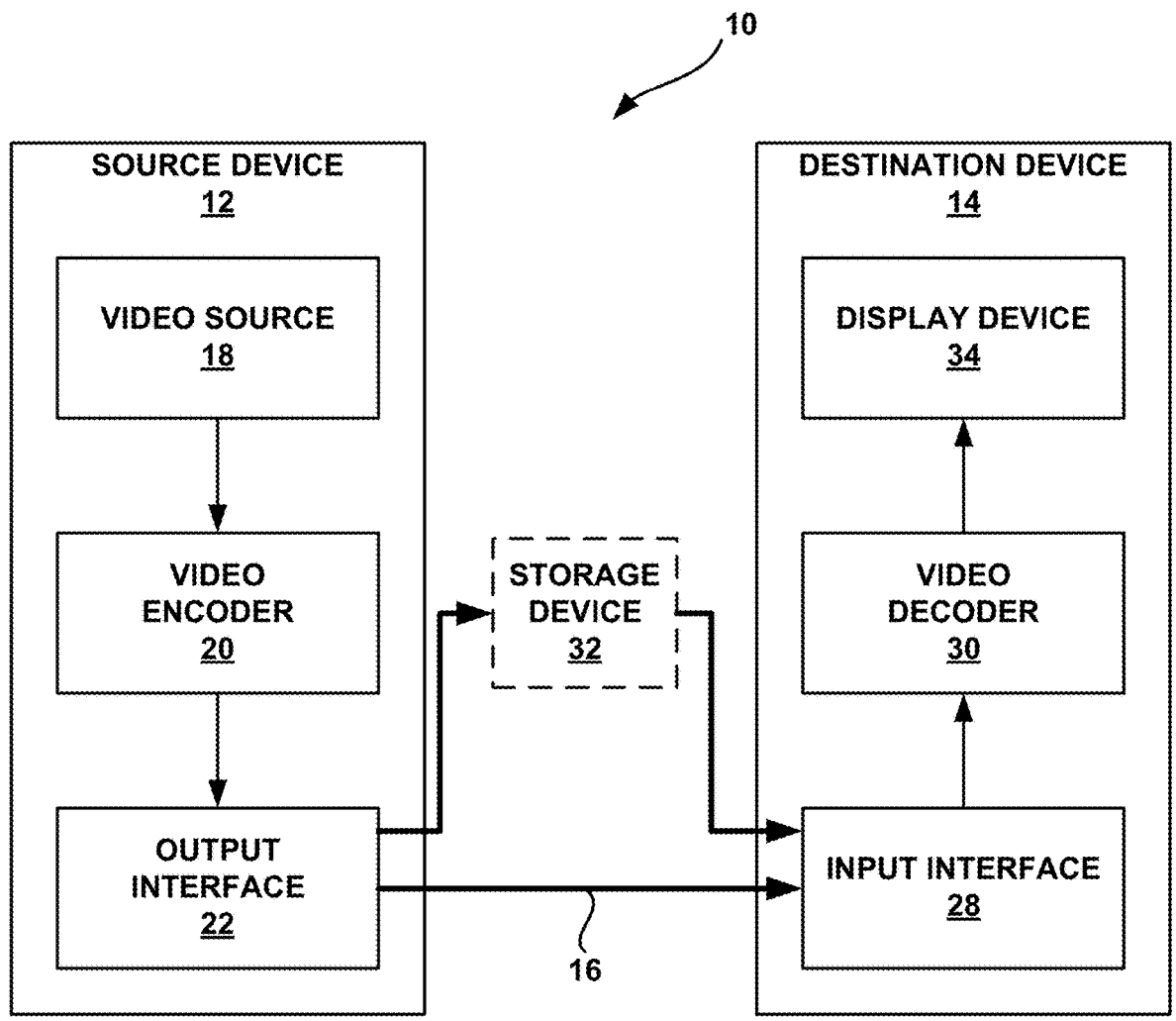
FIG. 1 is a block diagram illustrating an example video encoding and decoding system that may utilize the techniques described in this disclosure.

Various video coding standards, including the recently developed High Efficiency Video Coding (HEVC) standard, include predictive coding modes for video blocks, where a block currently being coded (i.e., encoded or decoded) is predicted based on an already coded block of video data. In an intra prediction mode, the current block is predicted based on one or more previously coded, neighboring blocks in the same picture as the current block, while in an inter prediction mode the current block is predicted based on an already coded block in a different picture. In inter prediction mode, the process of determining a block of a previously coded frame to use as a predictive block is sometimes referred to as motion estimation, which is generally performed by a video encoder, and the process of identifying and retrieving a predictive block is sometimes referred to as motion compensation, which is performed by both video encoders and video decoders.

A video encoder typically determines how to code a sequence of video data by coding the video using multiple coding scenarios and identifying the coding scenario that produces a desirable rate-distortion tradeoff. When testing intra prediction coding scenarios for a particular video block, a video encoder typically tests the neighboring row of pixels (i.e. the row of pixels immediately above the block being coded) and tests the neighboring column of pixels (i.e. the column of pixels immediately to the left of the block being coded). In contrast, when testing inter prediction scenarios, the video encoder typically identifies candidate predictive blocks in a much larger search area, where the search area corresponds to video blocks in previously coded frames of video data.

It has been discovered, however, that for certain types of video images, such as video images that include text, symbols, or repetitive patterns, coding gains can be achieved relative to intra prediction and inter prediction by using an intra block copy (IBC) mode, which is also sometimes referred to as an intra motion compensation (IMC) mode. In the development of various coding standards, the term IMC mode was originally used, but later modified to IBC mode. In an IBC mode, a video encoder searches for a predictive block in the same frame or picture as the block being coded, as in an intra prediction mode, but the video encoder searches a wider search area and not just the neighboring rows and columns of pixels.

In IBC mode, the video encoder may determine an offset vector, also referred to sometimes as a motion vector or block vector, for identifying the predictive block within the same frame or picture as the block being predicted. The offset vector includes, for example, an x-component and a y-component, where the x-component identifies the horizontal displacement between a video block being predicted and the predictive block, and where the y-component identifies a vertical displacement between the video block being predicted and the predictive block. The video encoder signals, in the encoded bitstream, the determined offset vector so that a video decoder, when decoding the encoded bitstream, can identify the same predictive block selected by the video encoder.

Aspects of this disclosure relate to the simplification of candidate derivation and the addition of new candidates for various coding processes, such as for merge mode and/or advanced motion vector prediction (AMVP), that utilize candidate lists. Candidate lists are also referred to herein as motion vector candidate lists, and when referring to merge mode, may also be referred to as merge candidate lists or merge lists. As will be explained in greater detail below, the candidate list may include both IBC and inter prediction candidates. The term motion information, as used in this disclosure, may include both typical inter prediction motion information but may also include IBC information, such as a block vector.

When the video encoder performs inter prediction or IBC, the video encoder may signal motion information for the PUs. The motion information of a PU may include, for example, a reference picture index, a motion vector, and a prediction direction indicator. In some implementations of IBC, aspects of signaling IBC information may be unified with various aspects of inter prediction signaling. As one example, merge mode signaling and AMVP mode signaling may be modified to include IBC candidates.

To reduce the number of bits required to represent the motion information of the PUs, the video encoder may generate candidate lists for each of the PUs according to a merge mode or AMVP process. Each candidate in a candidate list for a PU may indicate motion information. The motion information indicated by some of the candidates in the candidate list may be based on the motion information of other PUs. For example, for HEVC merge mode, there may be five spatial candidate locations and one temporal candidate (that is, a temporal neighboring candidate) location. In some examples, the video encoder may generate additional candidates by combining partial motion vectors from already determined candidates, modifying candidates, or simply inserting zero motion vectors as candidates. These additional candidates are not considered to be original candidates and may be referred to in this disclosure as virtual candidates.

The techniques of this disclosure are generally related to techniques for generating candidate lists at the video encoder and techniques for generating the same candidate lists at a video decoder. A video encoder and a video decoder can generate the same candidate lists by implementing the same techniques for constructing the candidate list. For example, both a video encoder and video decoder may construct lists with the same number of candidates (e.g. five or six candidates for merge mode and two or three candidates for AMVP mode) and use the same decision making criteria for adding candidates to the lists. Although certain techniques for candidate list generation may be described in this disclosure with respect to a video encoder or to a video decoder, unless stated otherwise, the techniques should generally be understood to be equally applicable to the other of a video encoder of video decoder.

After generating the candidate list for a PU of the CU, the video encoder may select a candidate from the candidate list and output a candidate index in a bitstream. The selected candidate may be the candidate that has a motion vector, or block vector in the case of IBC, that points to a predictive block that most closely matches the target PU being coded. The candidate index may indicate a position of the selected candidate in the candidate list. The video encoder may also generate a predictive video block for the PU based on a reference block indicated by the motion information of the PU. The motion information of the PU may be determinable based on the motion information indicated by the selected candidate. For instance, in merge mode, the motion information of the PU may be the same as the motion information indicated by the selected candidate. In AMVP mode, the motion information of the PU may be determined based on a motion vector difference (or a block vector difference for IBC) of the PU and the motion information indicated by the selected candidate. The video encoder may generate one or more residual video blocks for the CU based on the predictive video blocks of the PUs of the CU and an original video block for the CU. The video encoder may then encode and output the one or more residual video blocks in the bitstream.

The bitstream may include data that identifies a selected candidate in a candidate list for a PU. The video decoder may determine motion information of the PUs based on motion information indicated by the selected candidates in the candidate lists of the PUs. The video decoder may identify one or more reference blocks for the PUs based on the motion information of the PUs. After identifying the one or more reference blocks of a PU, the video decoder may generate a predictive video block for the PU based on the one or more reference blocks of the PU. The video decoder may reconstruct a video block for the CU based on the predictive video blocks for the PUs of the CU and one or more residual video blocks for the CU.

For ease of explanation, this disclosure may describe locations or video blocks as having various spatial relationships with CUs or PUs. Such description may be interpreted to mean that the locations or video blocks have the various spatial relationships to the video blocks associated with the CUs or PUs. Furthermore, this disclosure may refer to a PU that a video coder (i.e., a video encoder or video decoder) is currently coding as the current PU. This disclosure may refer to a CU that a video coder is currently coding as the current CU. This disclosure may refer to a picture that a video coder is currently coding as the current picture.

The attached drawings illustrate examples. Elements indicated by reference numbers in the attached drawings correspond to elements indicated by like reference numbers in the following description. In this disclosure, elements having names that start with ordinal words (e.g., "first," "second," "third," and so on) do not necessarily imply that the elements have a particular order. Rather, such ordinal words are merely used to refer to different elements of a same or similar type.

FIG. 1 is a block diagram illustrating an example video encoding and decoding system 10 that may utilize the techniques described in this disclosure, including techniques for coding blocks in an IBC mode. As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 32. Similarly, encoded data may be accessed from storage device 32 by input interface. Storage device 32 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 32 may correspond to a file server or another intermediate storage device that may hold the encoded video generated by source device 12. Destination device 14 may access stored video data from storage device 32 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 32 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 32 for later access by destination device 14 or other devices, for decoding and/or playback.

Destination device 14 includes an input interface 28, a video decoder 30, and a display device 34. In some cases, input interface 28 may include a receiver and/or a modem. Input interface 28 of destination device 14 receives the encoded video data over link 16. The encoded video data communicated over link 16, or provided on storage device 32, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 34 may be integrated with, or external to, destination device 14. In some examples, destination device 14 may include an integrated display device and also be configured to interface with an external display device. In other examples, destination device 14 may be a display device. In general, display device 34 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to one or more video coding standards. Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. The latest joint draft of MVC is described in "Advanced video coding for generic audiovisual services," ITU-T Recommendation H.264, March 2010.

In addition, there is a newly developed video coding standard, namely High Efficiency Video Coding (HEVC), developed by the Joint Collaboration Team on Video Coding (JCT-VC) of ITU-T Video Coding Experts Group (VCEG) and ISO/IEC Motion Picture Experts Group (MPEG). A recent draft of HEVC is available from phenix.int-evry.fr/jct/doc_end_user/documents/12_Geneva/wg11/JCTVC-L1003-v34.zip. The HEVC standard is also presented jointly in Recommendation ITU-T H.265 and International Standard ISO/IEC 23008-2, both entitled "High efficiency video coding," and both published October, 2014.

New coding tools for screen-content material such as text and graphics with motion are also presently under development. These new coding tools may be implemented in extensions to HEVC, such as the H.265/HEVC screen content coding (SCC) extension. An SCC working draft (SCC WD), JCTVC-U1005, is available at http://phenix.int-evry.fr/jct/doc_end_user/documents/21_Warsaw/wg11/JCTVC-U1005-v1.zip. These new coding tools may also be implemented in successor standards to HEVC.

This disclosure will generally refer to the recently finalized HEVC specification text as HEVC version 1 or base HEVC. The range extension specification may become the version 2 of the HEVC. With respect to many coding tools, such as motion vector prediction, HEVC version 1 and the range extension specification are technically similar. Therefore, whenever this disclosure describes changes relative to HEVC version 1, the same changes may also apply to the range extension specification, which generally includes the base HEVC specification, plus some additional coding tools. Furthermore, it can generally be assumed that HEVC version 1 modules may also be incorporated into a decoder implementing the HEVC range extension.

It is generally contemplated that video encoder 20 of source device 12 may be configured to encode video data according to any of these current or future standards. Similarly, it is also generally contemplated that video decoder 30 of destination device 14 may be configured to decode video data according to any of these current or future standards.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

In HEVC and other video coding specifications, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may comprise a coding tree block of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in a raster scan order.

To generate a coded CTU, video encoder 20 may recursively perform quad-tree partitioning on the coding tree blocks of a CTU to divide the coding tree blocks into coding blocks, hence the name "coding tree units." A coding block may be an N×N block of samples. A CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block.

Video encoder 20 may partition a coding block of a CU into one or more prediction blocks. A prediction block is a rectangular (i.e., square or non-square) block of samples on which the same prediction is applied. A prediction unit (PU) of a CU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block. Video encoder 20 may generate predictive luma, Cb, and Cr blocks for luma, Cb, and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU. If video encoder 20 uses inter prediction to generate the predictive blocks of a PU, video encoder 20 may generate the predictive blocks of the PU based on decoded samples of one or more pictures other than the picture associated with the PU.

After video encoder 20 generates predictive luma, Cb, and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb, and Cr residual blocks of a CU into one or more luma, Cb, and Cr transform blocks. A transform block is a rectangular (e.g., square or non-square) block of samples on which the same transform is applied. A transform unit (TU) of a CU may comprise a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients.

Video encoder 20 may output a bitstream that includes a sequence of bits that forms a representation of coded pictures and associated data. The bitstream may comprise a sequence of NAL units. A NAL unit is a syntax structure containing an indication of the type of data in the NAL unit and bytes containing that data in the form of a RB SP interspersed as necessary with emulation prevention bits. Each of the NAL units includes a NAL unit header and encapsulates a RBSP. The NAL unit header may include a syntax element that indicates a NAL unit type code. The NAL unit type code specified by the NAL unit header of a NAL unit indicates the type of the NAL unit. A RB SP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a PPS, a second type of NAL unit may encapsulate an RBSP for a coded slice, a third type of NAL unit may encapsulate an RBSP for SEI messages, and so on. NAL units that encapsulate RBSPs for video coding data (as opposed to RBSPs for parameter sets and SEI messages) may be referred to as VCL NAL units.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. In addition, video decoder 30 may inverse quantize coefficient blocks associated with TUs of a current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

Figure 2:
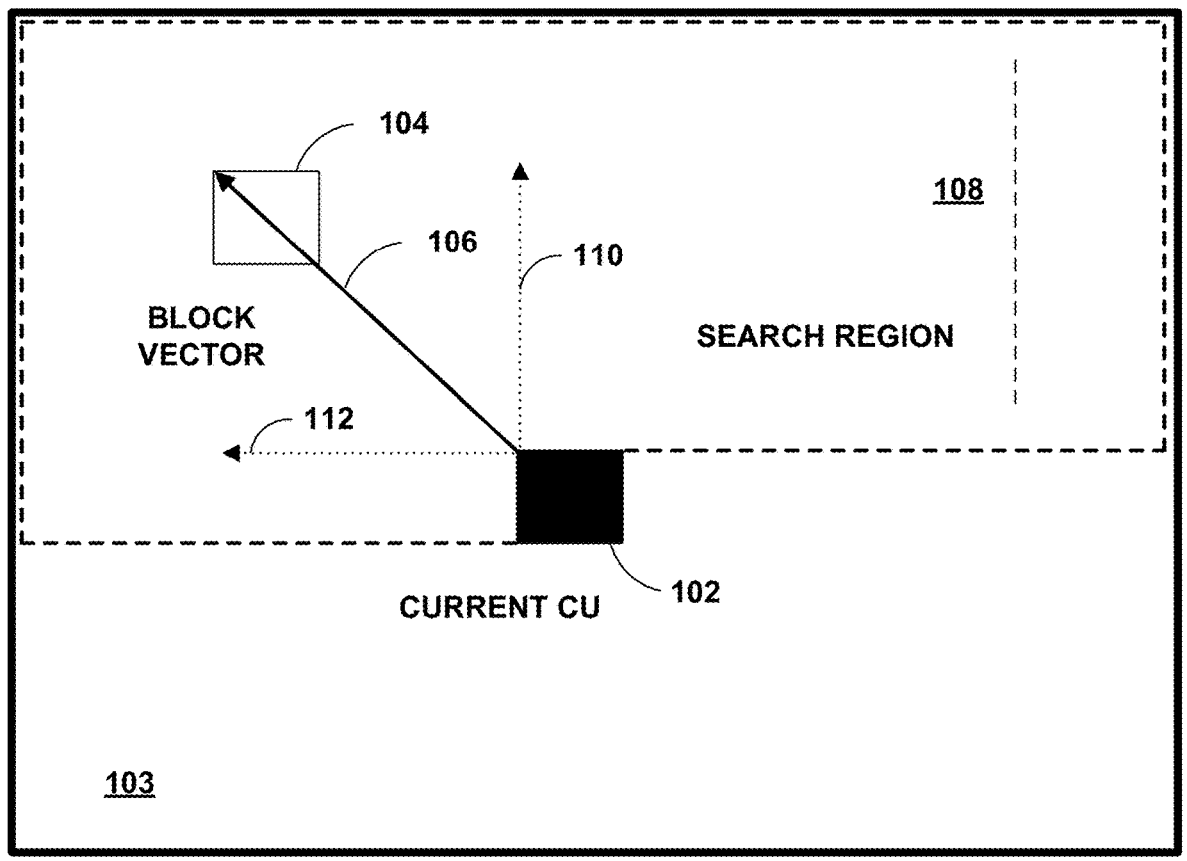
FIG. 2 is a conceptual diagram illustrating example intra block copy (BC) techniques.

FIG. 2 shows a conceptual illustration of the IBC mode. Video encoder 20 and video decoder 30 may, for example be configured to encode and decode blocks of video data using an IBC mode. Many applications, such as remote desktop, remote gaming, wireless displays, automotive infotainment, cloud computing, etc., are becoming routine in people's daily lives, and the coding efficiency when coding such content may be improved by the use of an IBC mode. System 10 of FIG. 1 may represent devices configured to execute any of these applications. Video content in these applications are often combinations of natural content, text, artificial graphics, etc. In text and artificial graphics regions of video frames, repeated patterns (such as characters, icons, symbols, etc.) often exist. As introduced above, IBC is a dedicated technique which enables removing this kind of redundancy and potentially improving the intra-frame coding efficiency as reported in JCT-VC M0350. As illustrated in FIG. 2, for the CUs which use IBC, the prediction signals are obtained from the already reconstructed region in the same frame. In the end, the offset vector, which indicates the position of the prediction signal displaced from the current CU, together with the residue signal are encoded.

For instance, FIG. 2 illustrates an example technique for predicting a current block 102 of video data within a current picture 103 according to a mode for intra prediction of blocks of video data from predictive blocks of video data within the same picture according to this disclosure, e.g., according to an IBC mode in accordance with the techniques of this disclosure. FIG. 2 illustrates a predictive block of video data 104 within current picture 103. A video coder, e.g., video encoder 20 and/or video decoder 30, may use predictive video block 104 to predict current video block 102 according to an IBC mode in accordance with the techniques of this disclosure.

Video encoder 20 selects predictive video block 104 for predicting current video block 102 from a set of previously reconstructed blocks of video data. Video encoder 20 reconstructs blocks of video data by inverse quantizing and inverse transforming the video data that is also included in the encoded video bitstream, and summing the resulting residual blocks with the predictive blocks used to predict the reconstructed blocks of video data. In the example of FIG. 2, intended region 108 within picture 103, which may also be referred to as an "intended area" or "raster area," includes the set of previously reconstructed video blocks. Video encoder 20 may define intended region 108 within picture 103 in variety of ways, as described in greater detail below. Video encoder 20 may select predictive video block 104 to predict current video block 102 from among the video blocks in intended region 108 based on an analysis of the relative efficiency and accuracy of predicting and coding current video block 102 based on various video blocks within intended region 108.

Intended region 108 may also be referred to in this disclosure as an IBC prediction region. This disclosure describes various techniques that may modify what blocks are included in intended region 108. Thus, when implementing the techniques of this disclosure, the size and shape of intended region 108 may be different than that shown in the example of FIG. 2.

Video encoder 20 determines two-dimensional vector 106 representing the location or displacement of predictive video block 104 relative to current video block 102. Two-dimensional vector 106, which is an example of an offset vector, includes horizontal displacement component 112 and vertical displacement component 110, which respectively represent the horizontal and vertical displacement of predictive video block 104 relative to current video block 102. Video encoder 20 may include one or more syntax elements that identify or define two-dimensional vector 106, e.g., that define horizontal displacement component 112 and vertical displacement component 110, in the encoded video bitstream. Video decoder 30 may decode the one or more syntax elements to determine two-dimensional vector 106, and use the determined vector to identify predictive video block 104 for current video block 102.

Current video block 102 may be a CU, or a PU of a CU. In some examples, a video coder, e.g., video encoder 20 and/or video decoder 30, may split a CU that is predicted according to IBC into a number of PUs. In such examples, the video coder may determine a respective (e.g., different) two-dimensional vector 106 for each of the PUs of the CU. For example, a video coder may split a 2N×2N CU into two 2N×N PUs, two N×2N PUs, or four N×N PUs. As other examples, a video coder may split a 2N×2N CU into ((N/2)×N+(3N/2)×N) PUs, ((3N/2)×N+(N/2)×N) PUs, (N×(N/2)+N×(3N/2)) PUs, (N×(3N/2)+N×(N/2)) PUs, four (N/2)×2N PUs, or four 2N×(N/2) PUs. In some examples, video coder may predict a 2N×2N CU using a 2N×2N PU.

Current video block 102 includes a luma video block (e.g., luma component) and a chroma video block (e.g., chroma component) corresponding to the luma video block. In some examples, video encoder 20 may only encode one or more syntax elements defining two-dimensional vectors 106 for luma video blocks into the encoded video bitstream. In such examples, video decoder 30 may derive two-dimensional vectors 106 for each of one or more chroma blocks corresponding to a luma block based on the two-dimensional vector signaled for the luma block. In the techniques described in this disclosure, in the derivation of the two-dimensional vectors for the one or more chroma blocks, video decoder 30 may modify the two-dimensional vector for the luma block if the two-dimensional vector for the luma block points to a sub-pixel position within the chroma sample.

Depending on the color format, e.g., color sampling format or chroma sampling format, a video coder may downsample corresponding chroma video blocks relative to the luma video block. Color format 4:4:4 does not include downsampling, meaning that the chroma blocks include the same number of samples in the horizontal and vertical directions as the luma block. Color format 4:2:2 is downsampled in the horizontal direction, meaning that there are half as many samples in the horizontal direction in the chroma blocks relative to the luma block. Color format 4:2:0 is downsampled in the horizontal and vertical directions, meaning that there are half as many samples in the horizontal and vertical directions in the chroma blocks relative to the luma block.

In examples in which video coders determine vectors 106 for chroma video blocks based on vectors 106 for corresponding luma blocks, the video coders may need to modify the luma vector. For example, if a luma vector 106 has integer resolution with horizontal displacement component 112 and/or vertical displacement component 110 being an odd number of pixels, and the color format is 4:2:2 or 4:2:0, the converted luma vector may not point an integer pixel location in the corresponding chroma block. In such examples, video coders may scale the luma vector for use as a chroma vector to predict a corresponding chroma block.

FIG. 2 shows a current CU that is being coded in an IBC mode. A predictive block for the current CU may be obtained from the search region. The search region includes already coded blocks from the same frame as the current CU. Assuming, for example, the frame is being coded in a raster scan order (i.e. left-to-right and top-to-bottom), the already coded blocks of the frame correspond to blocks that are to the left of and above the current CU, as shown in FIG. 2. In some examples, the search region may include all of the already coded blocks in the frame, while in other examples, the search region may include fewer than all of the already coded blocks. The offset vector in FIG. 2, sometimes referred to as a motion vector or prediction vector, identifies the differences between a top-left pixel of the current CU and a top-left pixel of the predictive block (labeled prediction signal in FIG. 2). Thus, by signaling the offset vector in the encoded video bitstream, a video decoder can identify the predictive block for the current CU, when the current CU is coded in an IBC mode.

IBC has been included in various implementations of SCC, including the SCC extension to HEVC. An example of IBC is described above with respect to FIG. 2, where the current CU/PU is predicted from an already decoded block of the current picture/slice. In IBC, a predictive block (e.g. block 104 in FIG. 2) may be a reconstructed block that has not been loop filtered, e.g. has not been deblock filtered or SAO filtered.

In current implementations of SCC, the block vector predictor is set to (−w, 0) at the beginning of each CTB, where w corresponds to the width of the CU. Such a block vector predictor is updated to be the one of the latest coded CU/PU if that is coded with IBC mode. If a CU/PU is not coded with IBC, then the block vector predictor remains unchanged. After block vector prediction, the block vector difference is encoded using a MV difference (MVD) coding method such as in HEVC.

Current implementations of IBC enable IBC coding at both CU and PU levels. For PU level IBC, 2N×N and N×2N PU partitions are supported for all the CU sizes. In addition, when the CU is the smallest CU, N×N PU partition is supported.

This disclosure describes techniques related to various aspects of IBC, including techniques related to the handling of intra block copy merge candidates and the padding of an unavailable IBC reference region within a current CTU. Below, this disclosure will discuss several observed potential problems in the current SCC WD and introduce potential solutions to address these problems.

A first example of a potential problem relates to IBC merge candidates. In the current SCC WD, the IBC luma block vectors are restricted to integer precision accuracy. Hence, there is no luma interpolation applied for any block vector of an IBC block. The block vector may be derived from merge mode or AMVP mode. In the case of merge mode, the merge candidates may be from an inter predicted block with fraction pel accuracy. Such a candidate cannot be used for IBC blocks. The current SCC WD allows the usage of these candidates for IBC block which violates the concept.

A second example of a potential problem relates to the padding of unavailable IBC reference regions within the current CTU. In the current SCC WD, the IBC prediction region follows a wavefront parallel processing (WPP) region as shown in FIG. 3.

Figure 3:
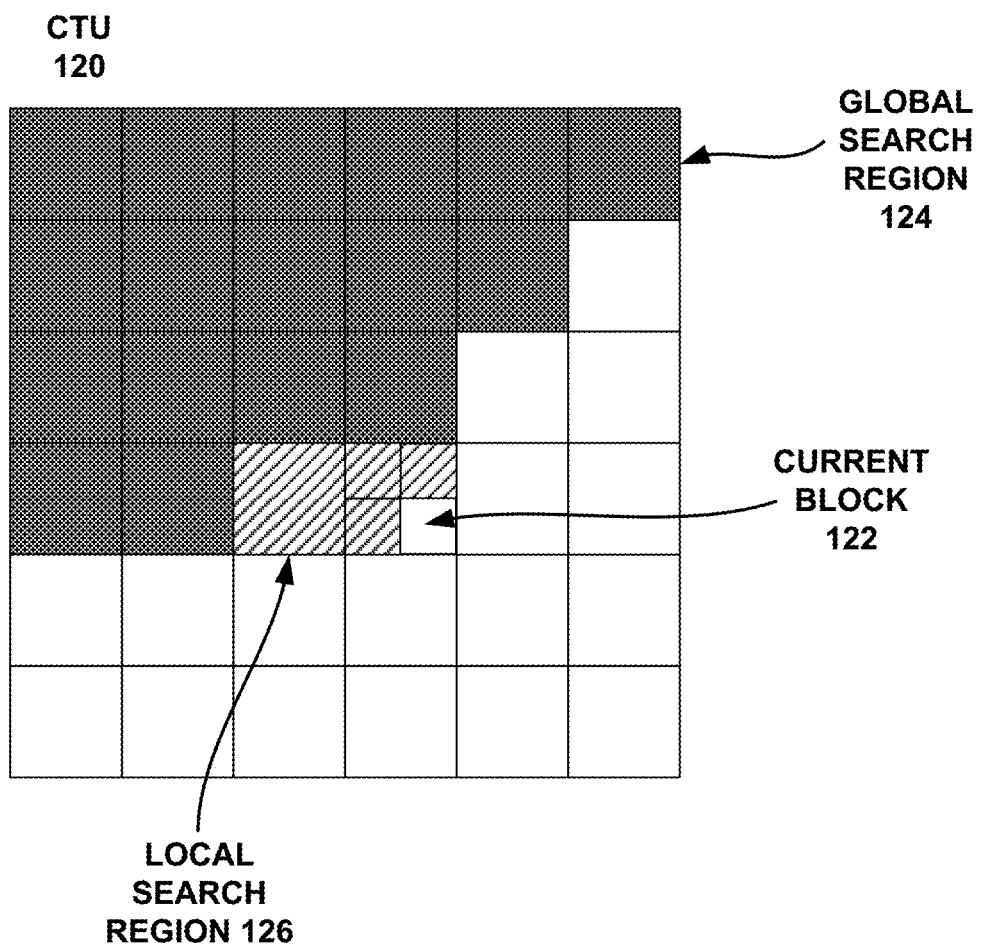
FIG. 3 shows an example of an IBC reference region.

FIG. 3 shows an example of a current CTU. CTU 120 is, for example, within one or more of a slice, a tile, or a picture. CTU 120 includes current block 122, which is a block currently being coded. CTU also includes global search region 124 and local search region 126, both of which include previously decoded blocks. Global search region 124 and local search region 126 collectively form the IBC reference region. CTU 120 also includes a region not available for referencing. The region not available referencing may, for example, include blocks that are not yet coded.

As seen in FIG. 3, the IBC reference region within the current CTU is limited to the region that is already decoded, which reduces the IBC referencing region. To address this issue and increase the size of the reference region, various techniques have been proposed in the past. For example, one proposed technique involved padding the unavailable region using a constant value (e.g., 1<<BitDepth) etc. This technique, however, may not be efficient.

This disclosure describes several techniques that may address the problems introduced above. The various techniques described herein can be applied independently or jointly in combination with others.

To potentially address the first problem discussed above, this disclosure describes techniques for rounding the merge vectors when the merge candidate corresponds to intra block copy mode (i.e., the reference picture is the same as the current picture). The term rounding in this context means to convert the fraction pel accuracy block vector to an integer pel accuracy block vector. One example method to achieve this is by right shifting the vector by 2 and then left shifting by 2. In some examples, before right shifting an offset may be added.

An example modification to the existing SCC WD text is set forth below, with italics representing proposed additions to the existing SCC WDD text.

8.5.3.2.2: Derivation Process for Luma Motion Vectors for Merge Mode

The following assignments are made with N being the candidate at position merge_idx[xOrigP][yOrigP] in the merging candidate list mergeCandList (N=mergeCandList [merge_idx[xOrigP][yOrigP] ]) and X being replaced by 0 or 1.

$$refIdxLX = refIdxLXN \quad (8\text{-}122)$$

$$predFlagLX = predFlagLXN \quad (8\text{-}123)$$

*When use_integer_mv_flag is equal to 0 and the reference picture is not the current picture*

$$mvLX[0] = mvLXN[0] \quad (8\text{-}124)$$

$$mvLX[1] = mvLXN[1] \quad (8\text{-}125)$$

*Otherwise (use_integer_mv_flag is equal to 1 or the reference picture is the current picture)*

$$mvLX[0] = (mvLXN[0] \gg 2) \ll 2 \quad (8\text{-}126)$$

$$mvLX[1] = (mvLXN[1] \gg 2) \ll 2 \quad (8\text{-}127)$$

As shown above in section 8.5.3.2.2, when the slice-level flag use_integer_mv_flag is set to a first value (e.g., 1 in the example above), then a motion vector precision for a current block must be integer pixel precision. When use_integer_mv_flag is set to a second value (e.g., 0 in the example above), then a motion vector precision for the block may be either integer pixel precision or a fractional pixel precision. If the reference picture is the current picture, however, then the motion vector is rounded to integer pixel precision even if the value of use_integer_mv_flag is set to the second value.

Figure 4:
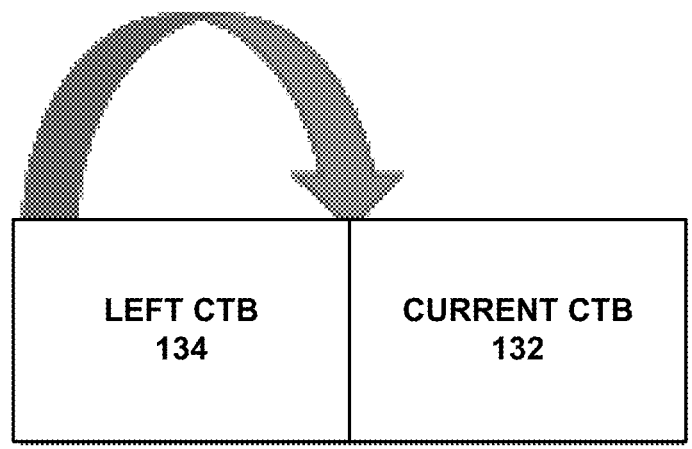
FIG. 4 shows an example of generating an IBC padded reference region for a current CTB before the start of decoding of the current CTB.

FIG. 4 shows an example of current CTB 132, which is a CTB currently being coded. CTB 132 is to the right of left CTB 134, which has already been coded. To potentially address the second problem discussed above, this disclosure introduces techniques to pad the current CTB (e.g., CTB 132) with the decoded samples from a left CTB (e.g, left CTB 134). FIG. 4 shows an example of generating an IBC padded reference region for current CTB 132 before starting to decode current CTB 132. As shown in the FIG. 4, before the start of the decoding of current CTB 132, the reference samples corresponding to current CTB 132 are generated by copying the decoded unfiltered samples from left CTB 134.

To allow prediction from the padded region within current CTB 132, in one examples, this disclosure proposes removing the following restrictions:

One or both the following conditions shall be true:
The value of (mvLX[0]>>2)+nPbW+xB1+offsetX is less than or equal to 0.
The value of (mvLX[1]>>2)+nPbH+yB1+offsetY is less than or equal to 0.

When operating in a non-4:4:4 chroma formats, interpolation for chroma block vectors is possible. This constraint is still maintained by following constraint in the SCC WD:
The following condition shall be true:

$$(xPb + (mvLX[0] \gg 2) + nPbSw - 1 + \text{offset}X)/\text{CtbSize}Y - xCurr/\text{CtbSize}Y \gt= yCurr/\text{CtbSize}Y - (yPb + (mvLX[1] \gg 2) + nPbSh - 1 + \text{offset}Y)/\text{CtbSize}Y$$

Figure 5:
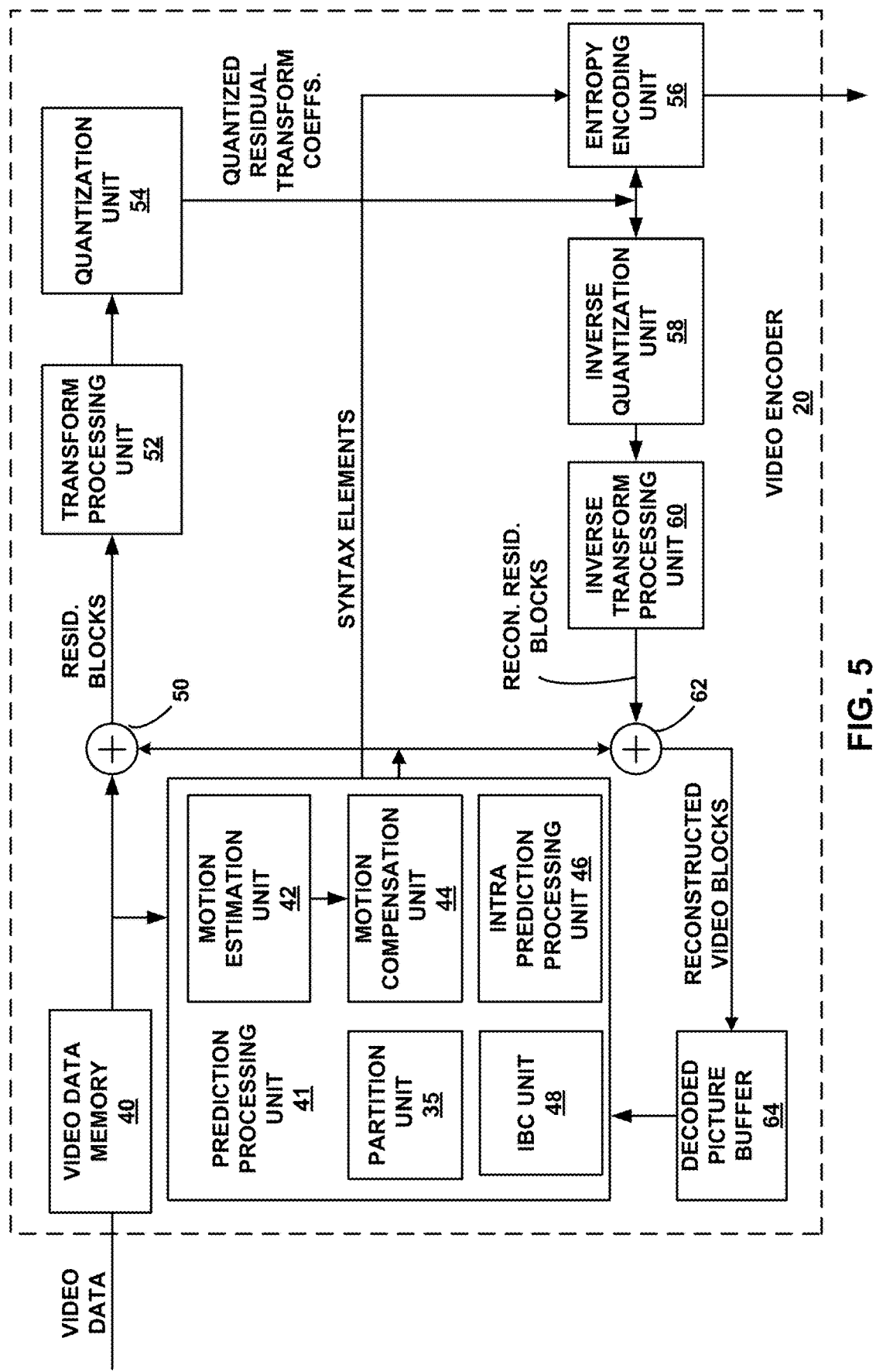
FIG. 5 is a block diagram illustrating an example video encoder that may implement the techniques described in this disclosure.

FIG. 5 is a block diagram illustrating an example video encoder 20 that may implement the IBC coding techniques described in this disclosure. Video encoder 20 may perform intra and inter coding of video blocks within video slices. Intra coding relies on spatial prediction to reduce or remove spatial redundancy in video within a given video frame or picture. Inter coding relies on temporal prediction to reduce or remove temporal redundancy in video within adjacent frames or pictures of a video sequence. Intra mode (I mode) may refer to any of several spatial based compression modes.

In the example of FIG. 5, video encoder 20 includes video data memory 40, prediction processing unit 41, decoded picture buffer 64, summer 50, transform processing unit 52, quantization unit 54, and entropy encoding unit 56. Prediction processing unit 41 includes partition unit 35, motion estimation unit 42, motion compensation unit 44, IBC unit 48, and intra prediction processing unit 46. For video block reconstruction, video encoder 20 also includes inverse quantization unit 58, inverse transform processing unit 60, and summer 62. An in-loop filter (not pictured) may be positioned between summer 62 and decoded picture buffer 64.

In various examples, a fixed or programmable hardware unit of video encoder 20 may be tasked to perform the techniques of this disclosure. Also, in some examples, the techniques of this disclosure may be divided among one or more of the illustrated fixed or programmable hardware units of video encoder 20 shown in FIG. 5, though other devices may also perform the techniques of this disclosure. For example, consistent with the example of FIG. 5, IBC unit 48 of video encoder 20 may perform the techniques of this disclosure, alone, or in combination with other units of video encoder 20, such as motion estimation unit 42, motion compensation unit 44, intra prediction processing unit 46, and entropy encoding unit 56. In some examples, video encoder 20 may not include IBC unit 48 and the functionality of IBC unit 48 may be performed by other components of prediction processing unit 41, such as motion estimation unit 42 and/or motion compensation unit 44.

Video data memory 40 may store video data to be encoded by the components of video encoder 20. The video data stored in video data memory 40 may be obtained, for example, from video source 18. Decoded picture buffer (DPB) 64 is a buffer that stores reference video data for use in encoding video data by video encoder 20 (e.g., in intra or inter coding modes, also referred to as intra or inter prediction coding modes). Video data memory 40 and DPB 64 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 40 and DPB 64 may be provided by the same memory device or separate memory devices. In various examples, video data memory 40 may be on-chip with other components of video encoder 20, or off-chip relative to those components.

As shown in FIG. 5, video encoder 20 receives video data, and partition unit 35 partitions the data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra coding modes or one of a plurality of inter coding modes, for the current video block based on error results (e.g., coding rate and the level of distortion). Prediction processing unit 41 may be configured to implement the techniques of this disclosure described above for encoding in IBC mode. Prediction processing unit 41 may provide the resulting intra or inter coded block to summer 50 to generate residual block data and to summer 62 to reconstruct the encoded block for use as a reference picture.

Intra prediction processing unit 46 within prediction processing unit 41 may perform intra predictive coding of the current video block relative to one or more neighboring blocks in the same frame or slice as the current block to be coded to provide spatial compression. Motion estimation unit 42 and motion compensation unit 44 within prediction processing unit 41 perform inter predictive coding of the current video block relative to one or more predictive blocks in one or more reference pictures to provide temporal compression.

Motion estimation unit 42 may be configured to determine the inter prediction mode for a video slice according to a predetermined pattern for a video sequence. The predetermined pattern may designate video slices in the sequence as P slices or B slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture. IBC unit 48 may determine vectors, e.g., block vectors, for IBC coding in a manner similar to the determination of motion vectors by motion estimation unit 42 for inter prediction, or may utilize motion estimation unit 42 to determine the block vector.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in decoded picture buffer 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter coded slice by comparing the position of the PU to the position of a predictive block of a reference picture. The reference picture may be selected from a first reference picture list (List 0) or a second reference picture list (List 1), each of which identify one or more reference pictures stored in decoded picture buffer 64. Motion estimation unit 42 sends the calculated motion vector to entropy encoding unit 56 and motion compensation unit 44.

In some examples, IBC unit 48 may generate vectors and fetch predictive blocks in a manner similar to that described above with respect to motion estimation unit 42 and motion compensation unit 44, but with the predictive blocks being in the same picture or frame as the current block and with the vectors being referred to as block vectors as opposed to motion vectors. In other examples, IBC unit 48 may use motion estimation unit 42 and motion compensation unit 44, in whole or in part, to perform such functions for IBC prediction according to the techniques described herein. In either case, for IBC, a predictive block may be a block that is found to closely match the block to be coded, in terms of pixel difference, which may be determined by sum of absolute difference (SAD), sum of squared difference (SSD), or other difference metrics, and identification of the block may include calculation of values for sub-integer pixel positions.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

As introduced above, when coding a block in an inter prediction mode, prediction processing unit may signal the motion information using a merge mode. For example, for a current block of a current picture, motion estimation unit 42 and/or IBC unit 48 may generate a merge candidate list, with each candidate in the merge candidate list having associated motion information. The motion information may include motion vectors that point to the same picture as the current block or a previously coded picture. Motion estimation unit 42 and/or IBC unit 48 may select a merge candidate from the merge candidate list and encode the current block using the motion information of the selected candidate. Prediction processing unit 41 may output, to entropy encoding unit 56, a syntax element identifying the selected merge candidate. Entropy encoding unit 56 may entropy encode the syntax element for inclusion in the encoded bitstream.

Whether the predictive video block is from the same picture according to IBC prediction, or a different picture according to inter prediction, video encoder 20 may form a residual video block by subtracting pixel values of the predictive block from the pixel values of the current video block being coded, forming pixel difference values. The pixel difference values form residual data for the block, and may include both luma component differences and chroma component differences. Summer 50 represents the component or components that perform this subtraction operation. IBC unit 48 and/or motion compensation unit 44 may also generate syntax elements associated with the video blocks and the video slice for use by a video decoder, such as video decoder 30, in decoding the video blocks of the video slice. The syntax elements may include, for example, syntax elements defining the vector used to identify the predictive block, any flags indicating the prediction mode, or any other syntax described with respect to the techniques of this disclosure.

Intra prediction processing unit 46 may intra-predict a current block, as an alternative to the inter-prediction performed by motion estimation unit 42 and motion compensation unit 44, or the IBC prediction performed by IBC unit 48, as described above. In particular, intra prediction processing unit 46 may determine an intra prediction mode, including an IBC mode, to use to encode a current block. In some examples, intra prediction processing unit 46 may encode a current block using various intra prediction modes, e.g., during separate encoding passes, and intra prediction processing unit 46 (or a mode select unit, in some examples) may select an appropriate intra prediction mode to use from the tested modes.

For example, intra prediction processing unit 46 may calculate rate-distortion values using a rate-distortion analysis for the various tested intra prediction modes, and select the intra prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra prediction processing unit 46 may calculate ratios from the distortions and rates for the various encoded blocks to determine which intra prediction mode exhibits the best rate-distortion value for the block.

In any case, after selecting an intra prediction mode for a block, intra prediction processing unit 46 may provide information indicative of the selected intra prediction mode for the block to entropy encoding unit 56. Entropy encoding unit 56 may encode the information indicating the selected intra prediction mode in accordance with the techniques of this disclosure. Video encoder 20 may include in the transmitted bitstream configuration data, which may include a plurality of intra prediction mode index tables and a plurality of modified intra prediction mode index tables (also referred to as codeword mapping tables), definitions of encoding contexts for various blocks, and indications of a most probable intra prediction mode, an intra prediction mode index table, and a modified intra prediction mode index table to use for each of the contexts.

After prediction processing unit 41 generates the predictive block for the current video block via either inter prediction or intra prediction, video encoder 20 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block for prediction of other video blocks. Motion compensation unit 44 and/or IBC unit 48 may calculate a reference block by adding the residual block to a predictive block of one of the reference pictures within one of the reference picture lists. Motion compensation unit 44 and/or IBC unit 48 may also apply one or more interpolation filters to the reconstructed residual block to calculate sub-integer pixel values for use in motion estimation.

Summer 62 adds the reconstructed residual block to the motion compensated prediction block produced by motion compensation unit 44 to produce a reference block for storage in decoded picture buffer 64. The reference block may be used by IBC unit 48, motion estimation unit 42 and motion compensation unit 44 as a reference block to inter predict a block in a subsequent video frame or picture.

Figure 6:
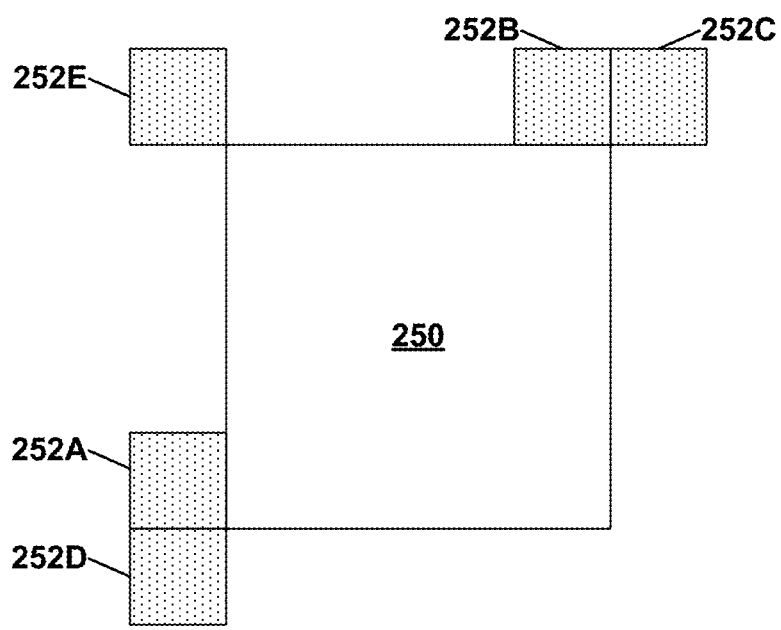
FIG. 6 is a conceptual diagram that illustrates a coding unit (CU) and example source locations associated with the CU.

Video encoder 20 of FIG. 5 may be configured to encode video blocks using a merge mode, e.g., in accordance with the process discussed below with respect to FIG. 7. FIG. 6 is a conceptual diagram that illustrates a CU 250 and example candidate locations 252A-E associated with CU 250, which video decoder 30 may use to constructing a merge candidate list. This disclosure may refer to candidate locations 252A-252E collectively as candidate locations 252. Candidate locations 252 represent spatial candidates that are in the same picture as CU 250. Candidate location 252A is located to the left of CU 250. Candidate location 252B is located above CU 250. Candidate location 252C is located to the upper-right of CU 250. Candidate location 252D is located to the lower-left of CU 250. Candidate location 252E is located to the above-left of CU 250. FIG. 6 will be used to provide examples of how prediction processing unit 41 may generate candidate lists.

Figure 7:
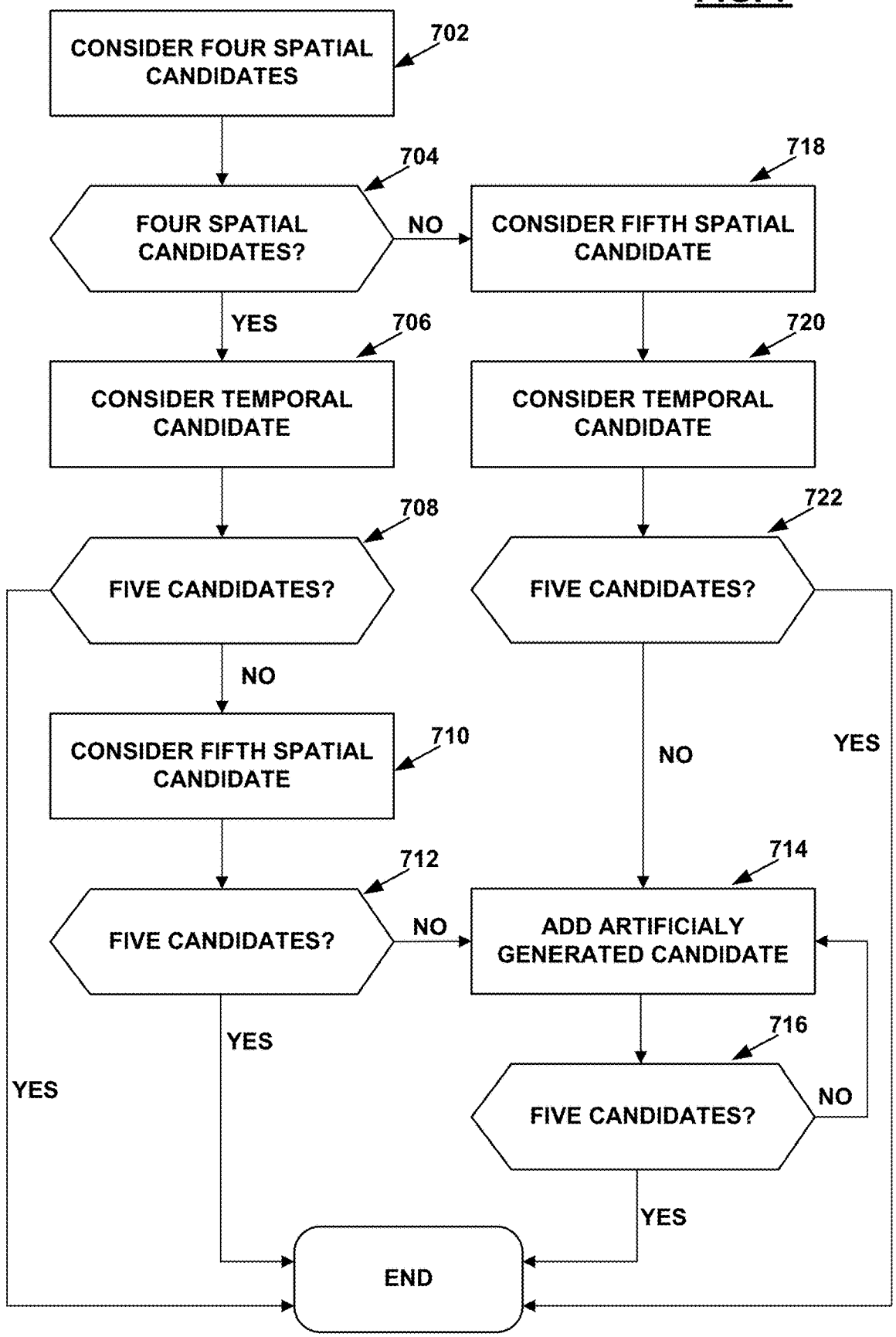
FIG. 7 is a flowchart that illustrates an example candidate list construction operation.

FIG. 7 is a flow chart that illustrates an example method for constructing a candidate list in accordance with the techniques of this disclosure. The techniques of FIG. 7 will be described with reference to a list that includes five candidates, although the techniques described herein may be also be used with lists of other sizes. The five candidates may each have a merge index (e.g. 0 to 4). The techniques of FIG. 7 will be described with reference to a generic video coder. The generic video coder may, for example, be a video encoder such as video encoder 20 or a video decoder such as video decoder 30. The techniques of FIG. 7 will further be described with reference to the CU and candidate locations described above in FIG. 6.

To construct the candidate list according to the example of FIG. 7, a video coder first considers four spatial candidates (702). The four spatial candidates may, for example, include candidate locations 252A, 252B, 252C, and 252D (as shown in FIG. 6). The four spatial candidates correspond to the motion information of four PUs in the same picture as the current CU (e.g. CU 250). The video coder may consider the four spatial candidates in the list in a specific order. For example, candidate location 252A may be considered first. If candidate location 252A is available, then candidate location 252A (i.e., the motion information associated with candidate location 252A) may be assigned to merge index 0. If candidate location 252A is unavailable, then the video coder may not include the motion information of candidate location 252A in the candidate list. A candidate location may be unavailable for various reasons. For example, the candidate location may be unavailable if the candidate location is not within the current picture. In another example, the candidate location may be unavailable if the candidate location is intra predicted. In another example, the candidate location may be unavailable if the candidate location is in a different slice than the current CU.

After considering candidate location 252A, the video coder may next consider candidate location 252B. If candidate location 252B is both available and different than candidate location 252A, then the video coder may add the motion information of candidate location 252B to the candidate list. In this particular context, the terms "same" and "different" refer to the motion information associated with the candidate location. Thus, two candidate locations are considered to be the same if the two candidates have the same motion information and are considered to be different if the two candidates have different motion information. If candidate location 252A was not available, then the video coder may assign the motion information of candidate location 252B to merge index 0. If candidate location 252A was available, then the vide coder may assign the motion information of candidate location 252 to merge index 1. If candidate location 252B is either not available or is the same as candidate location 252A, then the video coder may skip candidate location 252B and not include motion information from candidate location 252B in the candidate list.

Candidate location 252C is similarly considered for inclusion in the list by the video coder. If candidate location 252C is both available and not the same as candidate locations 252B and 252A, then the video coder assigns the motion information of candidate location 252C to the next available merge index. If candidate location 252C is either unavailable or is not different than at least one of candidate locations 252A and 252B, then the video coder does not include the motion information of candidate location 252C in the candidate list. Next, candidate location 252D is considered by the video coder. If candidate location 252D is both available and not the same as candidate locations 252A, 252B, and 252C, then the video coder assigns the motion information of candidate location 252D to the next available merge index. If candidate location 252D is either unavailable or is not different than at least one of candidate locations 252A, 252B, and 252C, then the video coder does not include the motion information of candidate location 252D in the candidate list. Although the above-example generally describes candidate locations 252A-D being considered individually for inclusion in the candidate list, in some implementations, all of candidate locations 252A-D may be first added to the candidate list with duplicates later removed from the candidate list.

After the video coder considers the first four spatial candidates, the candidate list may include the motion information of four spatial candidates or the list may include the motion information of fewer than four spatial candidates. If the list includes the motion information of four spatial candidates (704, yes), then the video coder considers a temporal candidate (706). The temporal candidate may correspond to the motion information of a collocated, or approximately collocated, PU of a picture other than the current picture. If the temporal candidate is both available and different than the first four spatial candidates, then the video coder may assign the motion information of the temporal candidate to merge index 4. If the temporal candidate is either not available or is the same as one of the first four spatial candidates, then the video coder does not include the motion information of the temporal candidate in the candidate list. Thus, after the video coder considers the temporal candidate (706), the candidate list may include either five candidates (the first four spatial candidates considered at block 902 and the temporal candidate considered at block 704) or may include four candidates (the first four spatial candidates considered at block 702). If the candidate list includes five candidates (708, yes), then the video coder is finished constructing the list.

If the candidate list includes four candidates (708, no), then the video coder may consider a fifth spatial candidate (710). The fifth spatial candidate may, for example, correspond to candidate location 252E. If the candidate at location 252E is both available and different than candidates at locations 252A, 252B, 252C, and 252D, then the video coder may add the motion information of the fifth spatial candidate to the candidate list assigned to merge index 4. If the candidate at location 252E is either not available or is not different than one at candidate locations 252A, 252B, 252C, and 252D, then the video coder may not include the motion information of the candidate at location 252 in the candidate list. Thus after considering the fifth spatial candidate (710), the list may include the motion information of five candidates (the first four spatial candidates considered at block 702 and the fifth spatial candidate considered at block 710) or may include four candidates (the first four spatial candidates considered at block 702).

If the candidate list includes five candidates (712, yes), then the video coder is finished generating the candidate list. If the candidate list includes four candidates (712, no), then the video coder adds artificially generated candidates (714) until the list includes five candidates (716, yes).

If after the video coder considers the first four spatial candidates, the list includes fewer than four spatial candidates (704, no), then the video coder may consider the fifth spatial candidate (718). The fifth spatial candidate may, for example, correspond to candidate location 252E. If the candidate at location 252E is both available and different than the candidates already included in the candidate list, then the video coder may add the fifth spatial candidate to the candidate list assigned to the next available merge index. If the candidate at location 252E is either not available or is not different than one of the candidates already included in the candidate list, then the video coder may not include the candidate at location 252E in the candidate list. The video coder can then consider a temporal candidate (720). If the temporal candidate is both available and different than the candidates already included in the candidate list, then the video coder may add the temporal candidate to the candidate list assigned to the next available merge index. If the temporal candidate is either not available or is not different than one of the candidates already included in the candidate list, then the video coder may not include the temporal candidate in the candidate list.

If after considering the fifth spatial candidate (block 718) and the temporal candidate (block 720) the candidate list includes five candidates (722, yes), then the video coder is finished generating the candidate list. If the candidate list includes fewer than five candidates (722, no), then the video coder may add artificially generated candidates (714) until the list includes five candidates (716, yes). The artificially generated candidates may, for example, include one or more of a combined bi-predictive merge candidate, a scaled bi-predictive merge candidate, and/or a zero vector merge/AMVP candidate. Any of the spatial, temporal, or artificially generated candidates may be IBC candidates with reference indexes that point to a current picture.

The techniques shown with respect to FIG. 7 merely represent one example of techniques that may be utilized for generating a merge candidate list. For example, other techniques for generating a candidate list may utilize a different number of candidates, include candidates in a different order, or include different types of candidates. While the techniques of FIG. 7 include many aspects of the HEVC merge candidate list process, FIG. 7 is not intended to be a representation of the exact processes implemented by HEVC.

As explained in additional detail above with respect FIGS. 2-4, video encoder 20 represents an example of a video encoder that may be configured to generate reference samples for a current CTB based on reference samples of a neighboring CTB, and for a current block of the CTB, locate a predictive block for the current block from the reference samples for the current CTB. The neighboring CTB may, for example, be a left neighboring CTB. The current block may be coded, for example, in AMVP mode or merge mode. The video encoder may be configured to determine for the current block a merge candidate, and a block vector of the merge candidate may point to a location in the CTB. To generate reference samples for a current CTB based on reference samples of the neighboring CTB, the video encoder may copy some or all pixel values of the neighboring CTB for corresponding locations of the current CTB.

As explained in additional detail above with respect FIGS. 2-4, video encoder 20 also represents an example of a video encoder that may, additionally or alternatively, pad values of a current CTB with values from a neighboring CTB that neighbors the current CTB and decode a current block of the current CTB using the padded values when a motion vector for the current block refers to a block within the current CTB. The neighboring CTB may, for example, be a left neighboring CTB. The current block may be coded, for example, in AMVP mode or merge mode. The video encoder may be configured to determine for the current block a merge candidate, and a block vector of the merge candidate may point to a location in the CTB. To generate reference samples for a current CTB based on reference samples of the neighboring CTB, the video encoder may copy some or all pixel values of the neighboring CTB for corresponding locations of the current CTB.

Figure 8:
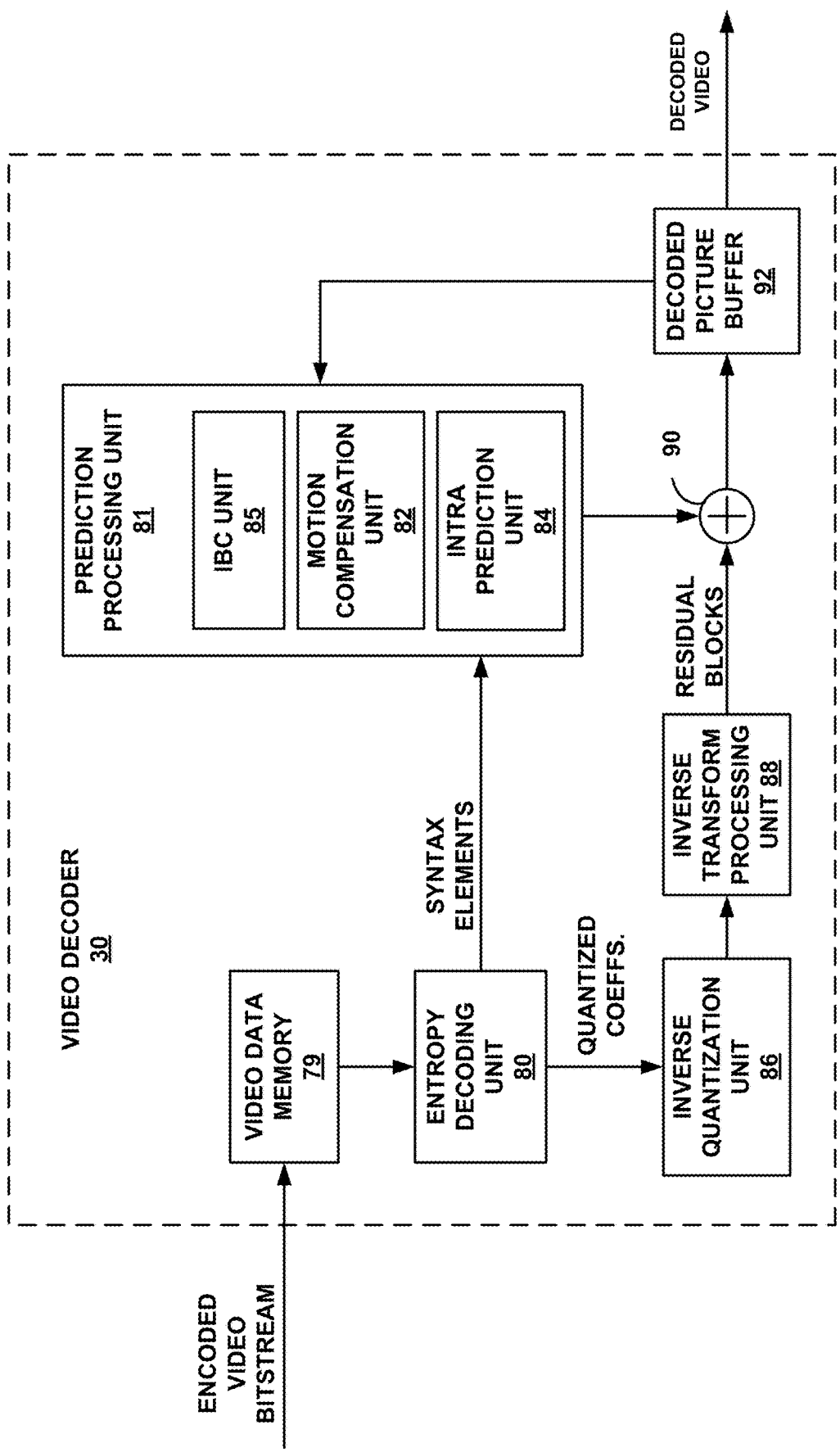
FIG. 8 is a block diagram illustrating an example video decoder that may implement the techniques described in this disclosure.

FIG. 8 is a block diagram illustrating an example video decoder 30 that may implement the techniques for IBC mode described in this disclosure. In the example of FIG. 8, video decoder 30 includes video data memory 79, entropy decoding unit 80, prediction processing unit 81, inverse quantization unit 86, inverse transform processing unit 88, summer 90, and decoded picture buffer 92. Prediction processing unit 81 includes IBC unit 85, motion compensation unit 82 and intra prediction processing unit 84. Video decoder 30 may, in some examples, perform a decoding pass generally reciprocal to the encoding pass described with respect to video encoder 20 from FIG. 5.

In various examples, a unit of video decoder 30 may be tasked to perform the techniques of this disclosure. Also, in some examples, the techniques of this disclosure may be divided among one or more of the units of video decoder 30. For example, IBC unit 85 may perform the techniques of this disclosure, alone, or in combination with other units of video decoder 30, such as motion compensation unit 82, intra prediction processing unit 84, and entropy decoding unit 80. In some examples, video decoder 30 may not include IBC unit 85 and the functionality of IBC unit 85 may be performed by other components of prediction processing unit 81, such as motion compensation unit 82.

Video data memory 79 may store video data, such as an encoded video bitstream, to be decoded by the components of video decoder 30. The video data stored in video data memory 79 may be obtained, for example, from storage device 32, from a local video source, such as a camera, via wired or wireless network communication of video data, or by accessing physical data storage media. Video data memory 79 may form a coded picture buffer (CPB) that stores encoded video data from an encoded video bitstream. Decoded picture buffer 92 is one example of a decoded picture buffer (DPB) that stores reference video data for use in decoding video data by video decoder 30 (e.g., in intra or inter coding modes, also referred to as intra or inter prediction coding modes). Video data memory 79 and DPB 92 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 79 and DPB 92 may be provided by the same memory device or separate memory devices. In various examples, video data memory 79 may be on-chip with other components of video decoder 30, or off-chip relative to those components.

During the decoding process, video decoder 30 receives an encoded video bitstream that represents video blocks of an encoded video slice and associated syntax elements from video encoder 20. Entropy decoding unit 80 of video decoder 30 entropy decodes the bitstream to generate quantized coefficients, motion vectors, and other syntax elements. Entropy decoding unit 80 forwards the motion vectors and other syntax elements to prediction processing unit 81. Video decoder 30 may receive the syntax elements at the video slice level and/or the video block level.

When the video slice is coded as an intra coded (I) slice, intra prediction processing unit 84 of prediction processing unit 81 may generate prediction data for a video block of the current video slice based on a signaled intra prediction mode and data from previously decoded blocks of the current frame or picture. Prediction processing unit 81 may be configured to implement the techniques of this disclosure for an IBC coding mode. When the video frame is coded as an inter coded (i.e., B or P) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in decoded picture buffer 92.

In other examples, when the video block is coded according to the IBC mode described herein, IBC unit 85 of prediction processing unit 81 produces predictive blocks for the current video block based on block vectors and other syntax elements received from entropy decoding unit 80. The predictive blocks may be within a reconstructed region within the same picture as the current video block defined by video encoder 20, and retrieved from DPB 92.

Motion compensation unit 82 and/or IBC unit 85 may determine prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra or inter prediction) used to code the video blocks of the video slice, an inter prediction slice type (e.g., B slice or P slice), construction information for one or more of the reference picture lists for the slice, motion vectors for each inter encoded video block of the slice, inter prediction status for each inter coded video block of the slice, and other information to decode the video blocks in the current video slice.

Similarly, IBC unit 85 may use some of the received syntax elements, e.g., a flag, to determine that the current video block was predicted using the IBC mode, construction information indicating which video blocks of the picture are within the reconstructed region and should be stored in DPB 92, block vectors for each IBC predicted video block of the slice, IBC prediction status for each IBC predicted video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Video decoder 30 may be configured to decode blocks coded in merge mode and/or AMVP mode, in which case prediction processing unit 81 may be configured to assemble the same candidate lists assembled by video encoder 20. For example, prediction processing unit 81 may also perform the techniques described above with respect to FIGS. 6 and 7. In the example of merge mode, after assembling the merge candidate list, prediction processing unit 81 may receive a syntax element from entropy decoding unit 80 identifying an index of a candidate in the merge candidate list. IBC unit 85 and/or intra prediction processing unit 84 may locate a predictive block using the motion information associated with the selected merge candidate. If the selected merge candidate refers to the same picture as the picture that includes the block currently being decoded, then IBC unit 85 and/or intra prediction processing unit 84 may round the motion vector for the selected merge candidate to a lower a lower precision motion vector to generate a rounded version of the motion vector of the neighboring block.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After motion compensation unit 82 or IBC unit 85 generates the predictive block for the current video block based on the vectors and other syntax elements, video decoder 30 forms a decoded video block by summing the residual blocks from inverse transform processing unit 88 with the corresponding predictive blocks generated by motion compensation unit 82 and IBC unit 85. Summer 90 represents the component or components that perform this summation operation to produce reconstructed video blocks.

Summer 90 represents the component or components that perform this summation operation. An in-loop filter (not pictured) may be positioned between summer 90 and decoded picture buffer 92. The decoded video blocks in a given frame or picture are then stored in decoded picture buffer 92, which stores reference pictures used for subsequent motion compensation. Decoded picture buffer 92 also stores decoded video for later presentation on a display device, such as display device 34 of FIG. 1.

As explained in additional detail above, video decoder 30 also represents an example of a video decoder configured to determine that a current block of a current picture is coded using a merge mode, determine a motion vector for a neighboring block of the current block, generate a merge candidate based on the motion vector for the neighboring block, and in response to a reference index of the merge candidate referring to a picture that includes the current block, round the motion vector to a lower precision motion vector. The video decoder 30 may, for example, add an unrounded version of the motion vector for the neighboring block of the current block to a merge candidate list. If the video decoder receives a merge candidate index indicating the motion vector for the neighboring block is to be used to decode the current block, then the video decoder may decode the current block using a rounded version of the motion vector for the neighboring block.

The motion vector for the neighboring block may include a first value (e.g., an integer value, a floating point value, or the like) representative of an x-component of the motion vector and a second value (which again, may be an integer value, a floating point value, or the like) representative of a y-component of the motion vector. To obtain the rounded version of the motion vector, video decoder 30 may round the first value representative of the x-component of the motion vector to obtain a first rounded value representative of an x-component of the rounded motion vector, and round the second value representative of the y-component of the motion vector to obtain a second rounded value representative of a y-component of the rounded motion vector.

To round the values, video decoder 30 may, for example, set values of bits in one or more least significant bit positions for the first and second values equal to zero, possibly including adding values to one or more bits of the next most significant bit to the least significant bits. Additionally, or alternatively, video decoder 30 may perform a bitwise left-shift operation on the first and second values to round these values. In some examples, rounding may include reducing or removing fractional elements of the motion vector components. For example, the original motion vector may have quarter-pixel precision, whereas the rounded motion vector may have half pixel precision, full pixel precision (that is, integer pixel precision), double pixel precision, or the like.

As explained in additional detail above with respect FIGS. 2-4, video decoder 30 also represents an example of a video decoder that may be configured to generate reference samples for a current CTB based on reference samples of a neighboring CTB, and for a current block of the CTB, locate a predictive block for the current block from the reference samples for the current CTB. The neighboring CTB may, for example, be a left neighboring CTB. The current block may be coded, for example, in AMVP mode or merge mode. The video decoder may be configured to determine for the current block a merge candidate, and a block vector of the merge candidate may point to a location in the CTB. To generate reference samples for a current CTB based on reference samples of the neighboring CTB, the video decoder may copy some or all pixel values of the neighboring CTB for corresponding locations of the current CTB.

As explained in additional detail above with respect to FIGS. 2-4, video decoder 30 also represents an example of a video decoder that may, additionally or alternatively, pad values of a current CTB with values from a neighboring CTB that neighbors the current CTB and decode a current block of the current CTB using the padded values when a motion vector for the current block refers to a block within the current CTB. The neighboring CTB may, for example, be a left neighboring CTB. The current block may be coded, for example, in AMVP mode or merge mode. The video decoder may be configured to determine for the current block a merge candidate, and a block vector of the merge candidate may point to a location in the CTB. To generate reference samples for a current CTB based on reference samples of the neighboring CTB, the video decoder may copy some or all pixel values of the neighboring CTB for corresponding locations of the current CTB.

Figure 9:
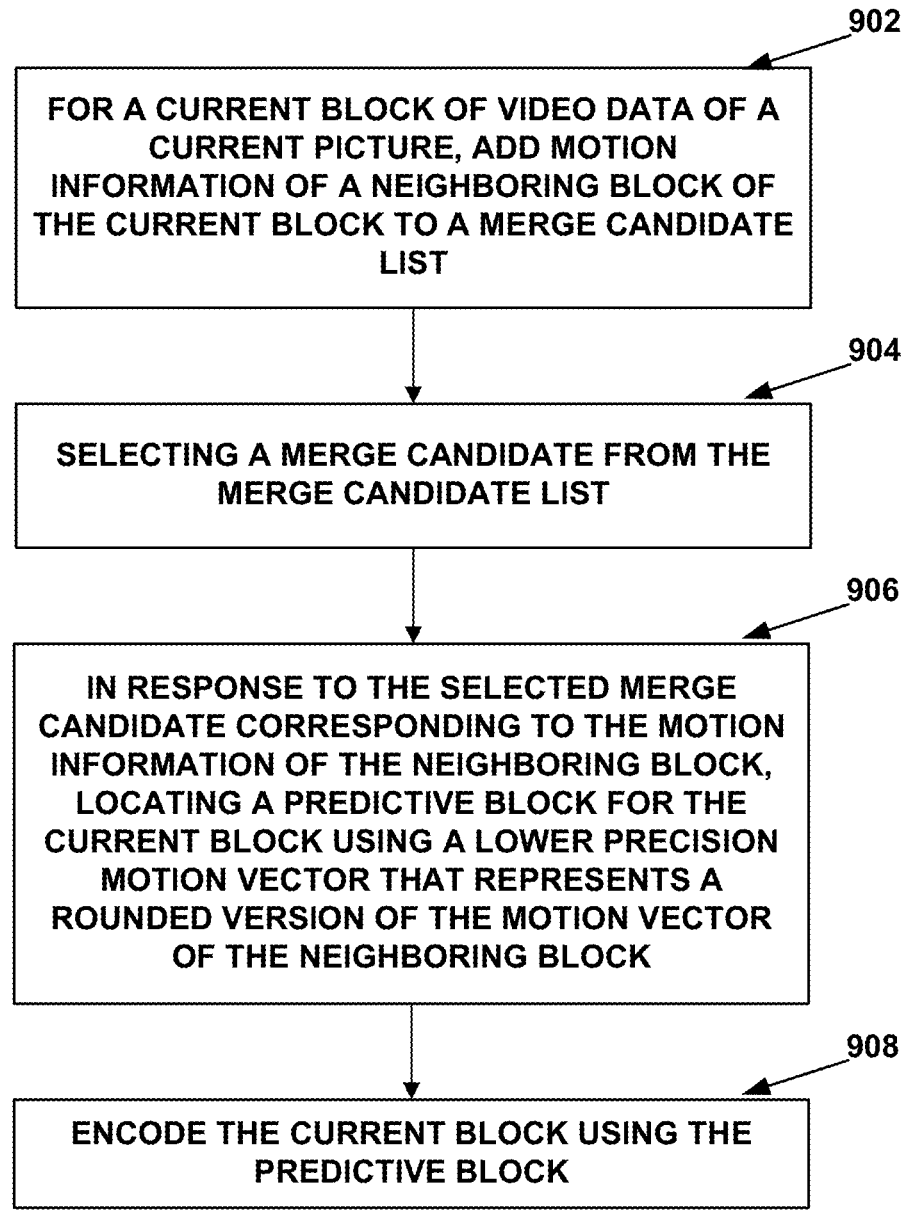
FIG. 9 is a flowchart illustrating an example operation of a video encoder, in accordance with one or more techniques of this disclosure.

FIG. 9 is a flowchart illustrating an example operation of a video encoder, in accordance with the techniques of this disclosure. The flowchart of FIG. 9 is provided as an example. In other examples, the flowcharts may include more, fewer, or different steps. The operation described in FIG. 9 may be performed by a video encoder such as video encoder 20 described above, but the operation of FIG. 9 is not limited to any particular type of video encoder.

In the example of FIG. 9, the video encoder encodes video data. For a current block of video data of a current picture, the video encoder adds motion information of a neighboring block of the current block to a merge candidate list (902). The motion information includes, for example, a motion vector of the neighboring block that refers to the current picture. The video encoder selects a merge candidate from the merge candidate list (904). The video encoder encodes the current block using motion information associated with the selected merge candidate. In response to the selected merge candidate corresponding to the motion information of the neighboring block, the video encoder locates a predictive block for the current block using a lower precision motion vector that represents a rounded version of the motion vector of the neighboring block (906). The video encoder encodes the current block using the predictive block (908).

As part of encoding the current block using the predictive block, the video encoder may, for example, generate, for output in a bitstream of encoded video data, an index identifying the selected merge candidate. The video encoder may additionally or alternatively compare the predictive block to an original block to determine residual data and transform and quantize the residual data.

The video encoder may, for example, predict the current block using the lower precision motion vector further in response to determining that a reference picture for the motion information corresponds to the current picture. The video encoder also generates a flag for output in the bitstream of encoded video data. A first value for the flag indicates a motion vector precision for the current block is an integer pixel precision, and a second value for the flag indicates the motion vector precision for the block can be either integer pixel precision or fractional pixel precision. To predict the current block using the lower precision motion vector, the video encoder may locate a predictive block in the current picture and compare the predictive block to a corresponding original block of the video data, and based on the comparison, generate residual data and encode the residual data (e.g., by transforming and quantizing the residual data, then entropy encoding the resulting quantized transform coefficients).

Figure 10:
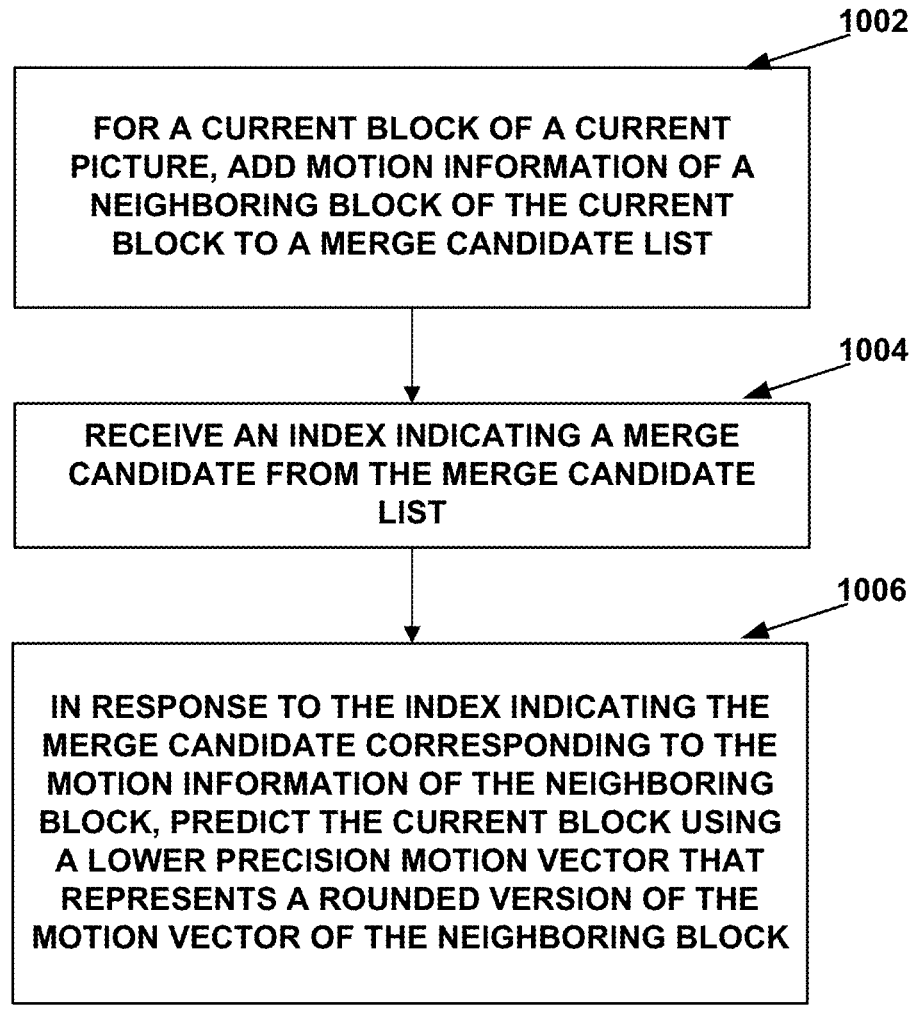
FIG. 10 is a flowchart illustrating an example operation of a video decoder, in accordance with one or more techniques of this disclosure.

FIG. 10 is a flowchart illustrating an example operation of a video decoder, in accordance with the techniques of this disclosure. The flowchart of FIG. 10 is provided as an example. In other examples, the flowcharts may include more, fewer, or different steps. The operation described in FIG. 10 may be performed by a video decoder such as video decoder 30 described above, but the operation of FIG. 10 is not limited to any particular type of video decoder.

In the example of FIG. 10, the video decoder decodes video data. For a current block of a current picture, the video decoder adds motion information of a neighboring block of the current block to a merge candidate list (1002). The motion information may, for example, include a motion vector of the neighboring block that refers to the current picture. The video decoder receives an index indicating a merge candidate from the merge candidate list (1004). In response to the index indicating the merge candidate corresponding to the motion information of the neighboring block, the video decoder predicts the current block using a lower precision motion vector that represents a rounded version of the motion vector of the neighboring block (1006).

The video decoder predicts the current block using the lower precision motion vector further in response to determining that a reference picture for the motion information corresponds to the current picture. The video decoder may also receive a flag, where a first value for the flag indicates a motion vector precision for the current block is an integer pixel precision and a second value for the flag indicates the motion vector precision for the block is one of the integer pixel precision or a fractional pixel precision. The video decoder may predict the current block using the lower precision motion vector further in response to the flag having the second value.

To predict the current block using the lower precision motion vector, the video decoder may locate a predictive block in the current picture. The video decoder may also receive residual data, generate a residual block based on the residual data, and add the residual block to the predictive block to form a reconstructed block. The neighboring block may be either a spatial neighboring block or a temporal neighboring block. In examples where the neighboring block is a spatial neighboring block, the motion information of the spatial neighboring block may include a reference index corresponding to the current picture. The spatial neighboring block may, for example, have a reference index corresponding to the current picture because the spatial neighboring block was predicted using IBC. A temporal neighboring block may be, for example, a collocated block to the current block in a different (e.g., previously coded) picture. In some examples, the collocated block may correspond to a block including a pixel at the center of the current block, or including a pixel at the bottom-right position of the current block. In examples where the neighboring block is a temporal neighboring block, a motion vector of the temporal neighboring block may be associated with a reference index corresponding to the current picture, even if the temporal neighboring block was inter predicted from a picture other than the current picture. In other words, when adding the motion information of the temporal neighboring block to the candidate list, the reference index for the temporal neighboring block may be modified.

In the examples of both FIGS. 9 and 10, the lower precision motion vector may, for example be an integer pixel precision motion vector, and the motion vector may be a fractional pixel precision motion vector. In other examples, the lower precision motion vector may also be a fractional precision motion vector that has lower precision than the motion vector. For example, if the motion vector has 1/16th pixel precision, then the lower precision motion vector may be any of 1/8th, quarter, half, or integer pixel precision. Similarly, if the motion vector has 1/8th pixel precision, then the lower precision motion vector may be any of quarter, half, or integer pixel precision.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   receiving a flag, wherein a value for the flag indicates that a motion vector precision for a first block of a current picture is a first precision, wherein the first precision is one of an integer pixel precision or a fractional pixel precision;
   predicting a first block of the current picture using a motion vector at the first precision by locating a first predictive block within an interpolated reference picture space;
   for a second block of the current picture that spatially neighbors the first block, generating a merge candidate list comprising a plurality of merge candidates, wherein generating the merge candidate list comprises adding the motion vector used to decode the first block to the merge candidate list for a merge candidate of the plurality of merge candidates and assigning a reference picture index to the merge candidate;
   receiving an index indicating that the merge candidate from the merge candidate list is to be used to decode the second block;
   determining that the merge candidate is an intra block copy (IBC) candidate by determining that the reference picture index for the merge candidate identifies the current picture that comprises the second block as a reference picture for the merge candidate;
   in response to determining that the merge candidate is the IBC candidate, rounding the motion vector having the first precision that was used to decode the first block of the current picture to a lower precision to determine a lower precision motion vector, wherein the first precision is higher than the lower precision;
   predicting the second block, using the lower precision motion vector and without applying interpolation filtering, by identifying a second predictive block within the current picture.

2. The method of claim 1, wherein the lower precision motion vector comprises an integer pixel precision motion vector.

3. The method of claim 1, wherein the first precision comprises the fractional pixel precision.

4. The method of claim 1, wherein predicting the second block using the lower precision motion vector comprises:
   receiving residual data;
   generating a residual block based on the residual data; and
   adding the residual block to the second predictive block to form a reconstructed block.

5. The method of claim 1, further comprising:
   receiving the video data at a receiver of a wireless communication device;

storing the video data in a memory of the wireless communication device; and processing the video data on one or more processors of the wireless communication device.

6. The method of claim 5, wherein the wireless communication device comprises a telephone handset and wherein receiving the video data at the receiver of the wireless communication device comprises demodulating, according to a wireless communication standard, a signal comprising the video data.

7. A method of encoding video data, the method comprising:
determining that a motion vector precision for a first block of a current picture is a first precision, wherein the first precision is one of an integer pixel precision or a fractional pixel precision;
predicting the first block of the current picture using a motion vector at the first precision by locating a first predictive block within an interpolated reference picture space;
for a second block of the current picture that spatially neighbors the first block, generating a merge candidate list comprising a plurality of merge candidates, wherein generating the merge candidate list comprises adding the motion vector used to encode the first block to the merge candidate list for a merge candidate of the plurality of merge candidates and assigning a reference picture index to the merge candidate;
selecting the merge candidate from the merge candidate list to encode the second block;
determining that the merge candidate is an intra block copy (IBC) candidate by determining that the reference picture index for the merge candidate identifies the current picture that comprises the second block as a reference picture for the merge candidate;
in response to determining that the merge candidate is the IBC candidate, rounding the motion vector having the first precision that was used to encode the first block of the current picture to a lower precision to determine a lower precision motion vector, wherein the first precision is higher than the lower precision;
locating a second predictive block for the second block, in the current picture, using the lower precision motion vector and without applying interpolation filtering; and
encoding the second block using the second predictive block.

8. The method of claim 7, further comprising:
generating a flag, wherein a first value for the flag indicates the motion vector precision for the first block is an integer pixel precision, and wherein a second value for the flag indicates the motion vector precision for the first block is one of the integer pixel precision or a fractional pixel precision.

9. The method of claim 7, wherein the lower precision motion vector comprises an integer pixel precision motion vector.

10. The method of claim 7, wherein the first precision comprises a fractional pixel precision.

11. The method of claim 7, further comprising:
comparing the second predictive block to a corresponding original block of the video data;
based on the comparison, generating residual data; and
encoding the residual data.

12. The method of claim 7, further comprising:
storing the video data in a memory of a wireless communication device;

processing the video data on one or more processors of the wireless communication device; and transmitting the video data from a transmitter of the wireless communication device.

13. The method of claim 12, wherein the wireless communication device comprises a telephone handset and wherein transmitting the video data from the transmitter of the wireless communication device comprises modulating, according to a wireless communication standard, a signal comprising the video data.

14. A device for decoding video data, the device comprising:
a memory configured to store the video data;
one or more processors configured to:
receive a flag, wherein a value for the flag indicates that a motion vector precision for a first block of a current picture is a first precision, wherein the first precision is one of an integer pixel precision or a fractional pixel precision;
predict the first block of the current picture using a motion vector at the first precision by locating a first predictive block within an interpolated reference picture space;
for a second block of the current picture that spatially neighbors the first block, generate a merge candidate list comprising a plurality of merge candidates, wherein to generate the merge candidate list, the one or more processors are configured to add the motion vector used to decode the first block to the merge candidate list for a merge candidate of the plurality of merge candidates and assign a reference picture index to the merge candidate;
receive an index indicating that the merge candidate from the merge candidate list is to be used to decode the second block;
determine that the merge candidate is an intra block copy (IBC) candidate by determining that the reference picture index for the merge candidate identifies the current picture that comprises the second block as a reference picture for the merge candidate;
in response to determining that the merge candidate is the IBC candidate, round the motion vector having the first precision that was used to decode the first block of the current picture to a lower precision to determine a lower precision motion vector, wherein the first precision is higher than the lower precision;
predict the second block, using the lower precision motion vector and without applying interpolation filtering, by identifying a second predictive block within the current picture.

15. The device of claim 14, wherein the lower precision motion vector comprises an integer pixel precision motion vector.

16. The device of claim 14, wherein the first precision comprises a fractional pixel precision.

17. The device of claim 14, wherein the one or more processors are further configured to:
receive residual data;
generate a residual block based on the residual data; and
add the residual block to the second predictive block to form a reconstructed block.

18. The device of claim 14, wherein the device comprises a wireless communication device, further comprising a receiver configured to receive encoded video data.

19. The device of claim 18, wherein the wireless communication device comprises a telephone handset and wherein the receiver is configured to demodulate, according to a wireless communication standard, a signal comprising the encoded video data.

20. A device for encoding video data, the device comprising:
    a memory configured to store the video data;
    one or more processors configured to:
        determine that a motion vector precision for a first block of a current picture is a first precision, wherein the first precision is one of an integer pixel precision or a fractional pixel precision;
        predict the first block of the current picture using a motion vector at the first precision by locating a first predictive block within an interpolated reference picture space;
        for a second block of the current picture that spatially neighbors the first block, generate a merge candidate list comprising a plurality of merge candidates, wherein to generate the merge candidate list, the one or more processors are configured to add the motion vector used to encode the first block to the merge candidate list for a merge candidate of the plurality of merge candidates and assigning a reference picture index to the merge candidate;
        select the merge candidate from the merge candidate list to encode the second block;
        determine that the merge candidate is an intra block copy (IBC) candidate by determining that the reference picture index for the merge candidate identifies the current picture that comprises the second block as a reference picture for the merge candidate;
        in response to determining that the merge candidate is the IBC candidate, round the motion vector having the first precision that was used to encode the first block of the current picture to a lower precision to determine a lower precision motion vector, wherein the first precision is higher than the lower precision;
        locate a second predictive block for the second block, in the current picture, using the lower precision motion vector and without applying interpolation filtering; and
        encode the second block using the second predictive block.

21. The device of claim 20, wherein the one or more processors are further configured to:
    generate a flag, wherein a first value for the flag indicates a motion vector precision for the first block is an integer pixel precision, and wherein a second value for the flag indicates the motion vector precision for the first block is one of the integer pixel precision or a fractional pixel precision.

22. The device of claim 20, wherein the lower precision motion vector comprises an integer pixel precision motion vector.

23. The device of claim 20, wherein the first precision comprises a fractional pixel precision.

24. The device of claim 20, wherein the one or more processors are further configured to:
    compare the second predictive block to a corresponding original block of the video data;
    based on the comparison, generate residual data; and
    encode the residual data.

25. The device of claim 20, wherein the device comprises a wireless communication device, further comprising a transmitter configured to transmit encoded video data.

26. The device of claim 25, wherein the wireless communication device comprises a telephone handset and wherein the transmitter is configured to modulate, according to a wireless communication standard, a signal comprising the encoded video data.

27. A device for decoding video data, the device comprising:
    receiving a flag, wherein a value for the flag indicates that a motion vector precision for a first block of a current picture is a first precision, wherein the first precision is one of an integer pixel precision or a fractional pixel precision;
    means for predicting the first block of the current picture using a motion vector at a first precision by locating a first predictive block within an interpolated reference picture space;
    means for generating a merge candidate list comprising a plurality of merge candidates for a second block of the current picture that spatially neighbors the first block, wherein the means for generating the merge candidate list comprises means for adding the motion vector used to decode the first block to the merge candidate list for a merge candidate of the plurality of merge candidates and means for assigning a reference picture index to the merge candidate;
    receiving an index indicating that the merge candidate from the merge candidate list is to be used to decode the second block;
    determining that the merge candidate is an intra block copy (IBC) candidate by determining that the reference picture index for the merge candidate identifies the current picture that comprises the second block as a reference picture for the merge candidate;
    means for rounding the motion vector having the first precision that was used to decode the first block of the current picture to a lower precision to determine a lower precision motion vector in response to determining that the merge candidate is the IBC candidate, wherein the first precision is higher than the lower precision;
    means for predicting the second block, using the lower precision motion vector and without applying interpolation filtering, by identifying a second predictive block within the current picture.

28. The device of claim 27, wherein the lower precision motion vector comprises an integer pixel precision motion vector.

29. The device of claim 27, wherein the first precision comprises a fractional pixel precision.

30. A non-transitory computer readable storage medium storing instructions that when executed by one or more processors cause the one or more processors to:
    receive a flag, wherein a value for the flag indicates that a motion vector precision for a first block of a current picture is a first precision, wherein the first precision is one of an integer pixel precision or a fractional pixel precision;
    predict the first block of the current picture using a motion vector at a first precision by locating a first predictive block within an interpolated reference picture space;
    for a second block of the current picture that spatially neighbors the first block, generate a merge candidate list comprising a plurality of merge candidates, wherein wherein to generate the merge candidate list, the instructions cause the one or more processors to add the motion vector used to decode the first block to the merge candidate list as a merge candidate of the plurality of merge candidates and assign a reference picture index to the merge candidate;

receive an index indicating that the merge candidate from the merge candidate list is to be used to decode the second block;

determine that the merge candidate is an intra block copy (IBC) candidate by determining that the reference picture index for the merge candidate identifies the current picture that comprises the second block as a reference picture for the merge candidate;

in response to determining that the merge candidate is the IBC candidate, round the motion vector having the first precision that was used to decode the first block of the current picture to a lower precision to determine a lower precision motion vector, wherein the first precision is higher than the lower precision;

predict the second block using the lower precision motion vector and without applying interpolation filtering, by identifying a second predictive block within the current picture.

31. The non-transitory computer readable storage medium of claim 30, wherein the lower precision motion vector comprises an integer pixel precision motion vector.

32. The non-transitory computer readable storage medium of claim 30, wherein the first precision comprises a fractional pixel precision.

\* \* \* \* \*